United States Patent
Cox et al.

(10) Patent No.: US 9,886,175 B1
(45) Date of Patent: Feb. 6, 2018

(54) ADAPTIVE AND SPECIAL USER INTERFACE MODES

(71) Applicant: EMC IP Holding Company LLC, Hopkinton, MA (US)

(72) Inventors: Timothy J. Cox, Mendon, MA (US); Rhon Porter, South Grafton, MA (US); Scott E. Joyce, Foxboro, MA (US); Kendra Marchant, Arlington, MA (US); Donald E. Labaj, Northborough, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 1008 days.

(21) Appl. No.: 14/132,308

(22) Filed: Dec. 18, 2013

(51) Int. Cl.
*G06F 3/00* (2006.01)
*G06F 9/44* (2006.01)
*G06F 9/46* (2006.01)
*G06F 13/00* (2006.01)
*G06F 3/0484* (2013.01)

(52) U.S. Cl.
CPC .................. *G06F 3/0484* (2013.01)

(58) Field of Classification Search
None
See application file for complete search history.

(56) References Cited

U.S. PATENT DOCUMENTS

| | | | |
|---|---|---|---|
| 7,676,483 B2 * | 3/2010 | Klug | G06Q 10/06 703/6 |
| 7,895,522 B2 * | 2/2011 | Wong | H04L 67/36 715/243 |
| 2009/0204900 A1 * | 8/2009 | Champion | G06F 3/0482 715/738 |

OTHER PUBLICATIONS

Mueller et al, Best Practices for NI TestStand User Interface Development, National Instruments, Nov. 2013, 9 pages.*
Criado et al, Adapting Component-based User Interfaces at Runtime using Observers, University of Almeria, Spain, Sep. 2011, 6 pages.*
Iribarne et al., An Interaction Meta-model for Cooperative Component-based User Interface, Springer-Verlag Berlin Hidelberg, 2010, 10 pages.*
U.S. Appl. No. 13/200,139, filed Sep. 19, 2011, Zhang, et al.
U.S. Appl. No. 13/800,044, filed Mar. 13, 2013, Joyce, et al.
U.S. Appl. No. 14/031,210, filed Sep. 19, 2013, Joyce, et al.

* cited by examiner

*Primary Examiner* — Diem Cao
(74) *Attorney, Agent, or Firm* — Muirhead and Saturnelli, LLC

(57) ABSTRACT

Techniques for user interface customization of an application are described. A navigational structure file is received including a description of a hierarchical structure describing a navigational flow of the application. The hierarchical structure may include objects corresponding to different navigation points of the application whereby interaction with a user interface element causes transition or navigation from a first navigation point of the application to a second navigation point of the application as described in the hierarchical structure. It is determined whether any one of a defined set of one or more trigger conditions occurs. Responsive to determining an occurrence of a trigger condition in the defined set, first processing is performed in accordance with the trigger condition that has occurred to produce a customized user interface displayed to a user and to produce a customized navigational flow of the application.

17 Claims, 22 Drawing Sheets

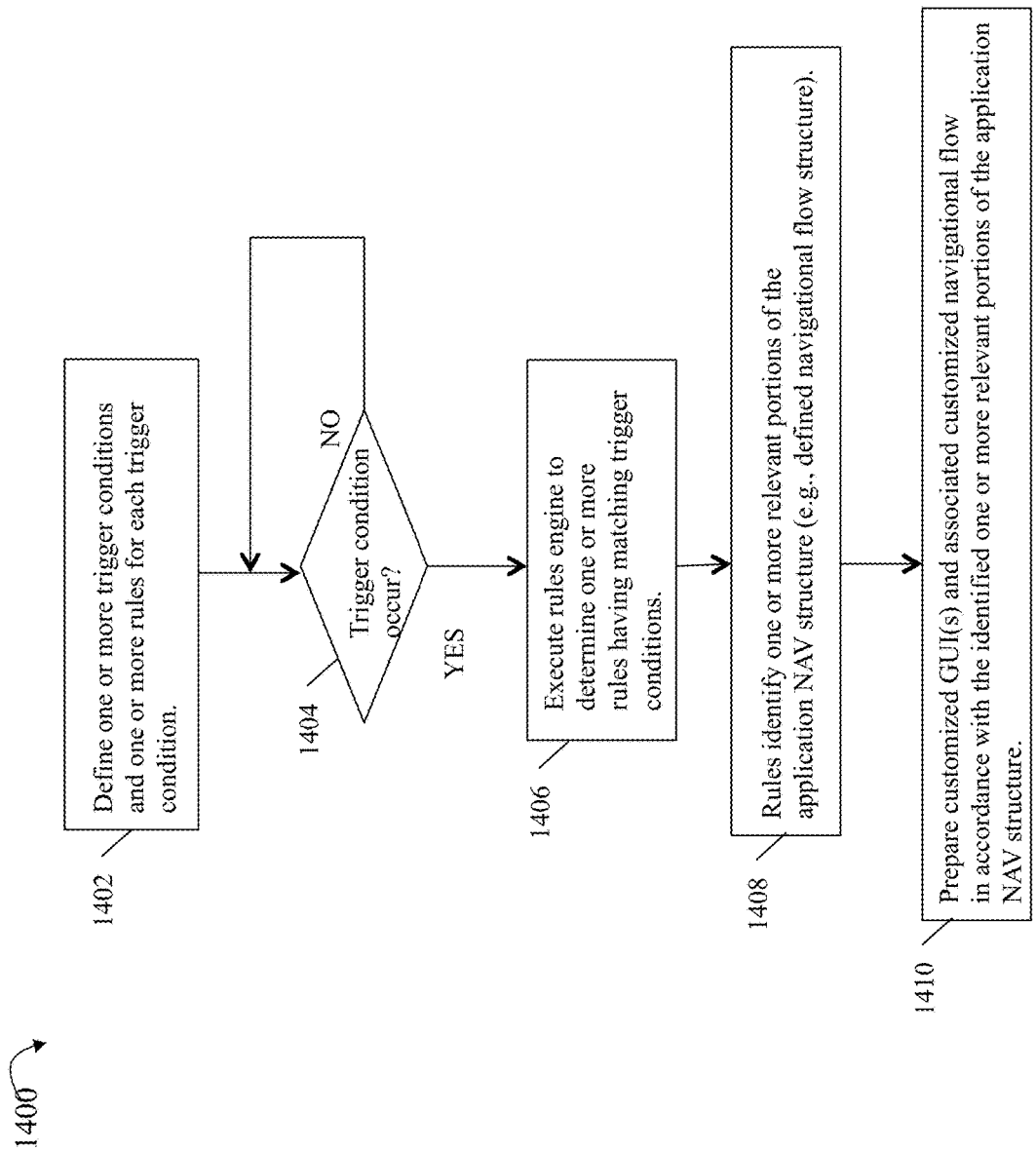

ADAPTIVE AND SPECIAL USER INTERFACE MODES

BACKGROUND

Technical Field

This application generally relates to user interfaces.

Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a data storage system including a plurality of host interface units, disk drives, and disk interface units. The host systems access the data storage system through a plurality of channels provided therewith. Host systems provide data and access control information through the channels and the storage system provides data to the host systems also through the channels. The host systems do not address the disk drives of the storage system directly, but rather, access what appears to the host systems as a plurality of logical disk units. The logical disk units may or may not correspond to the actual disk drives. Allowing multiple host systems to access the single data storage system allows the host systems to share data stored in the storage system. In order to facilitate sharing of the data on the data storage system, additional software on the data storage systems may also be used.

In connection with an application for management of data storage systems, or more generally any application, a user interface may be displayed. Existing applications providing a user interface may control various aspects of user interface (UI) elements, such as visual aspects of buttons, displayed text, and the like, by setting properties of the user interface elements within the application code.

SUMMARY OF THE INVENTION

In accordance with one aspect of the invention is a method for user interface customization for an application comprising: receiving a navigational structure file including a description of a hierarchical structure describing a navigational flow of the application, said hierarchical structure including objects corresponding to different navigation points of the application whereby interaction with a user interface element causes transition or navigation from a first navigation point of the application to a second navigation point of the application as described in the hierarchical structure; determining whether any one of a defined set of one or more trigger conditions occurs; and responsive to determining an occurrence of a trigger condition in the defined set, performing first processing in accordance with the trigger condition that has occurred to produce a customized user interface displayed to a user and to produce a customized navigational flow of the application. The trigger condition that has occurred may be any of a defined state or condition of a system for which the application is used, setting a user-specified mode for a user, and an automatically determined mode in accordance with a role assigned to a user. The customized navigational flow may be determined in accordance with one or more portions of the navigational structure file determined as relevant to the trigger condition that has occurred. The defined state or condition of the system may be an error condition or state of the system. The user specified mode may be one of a plurality of defined modes each based on a set of one or more tasks performed by a user of a system for which the application is used. The system may be a data storage system and the application may be used to perform data storage system management operations and tasks. The plurality of defined modes may include a provisioning mode, a configuration mode and a service mode. The customized user interface displayed to a user may be customized to include a simplified user interface with only navigation controls and user interface elements determined as relevant to the trigger condition that has occurred. The plurality of defined modes may be specialized modes and a first of the plurality of defined modes may be defined as the trigger condition that has occurred whereby the first defined mode may be selected or assigned to a user. Responsive to the trigger condition, the user may have limited navigation in the navigational structure of the application to one or more portions determined as relevant to the first defined mode. A rules file may include one or more rules, and each of said rules may identify at least one of the trigger conditions of the defined set and one or more portions of the navigational structure file relevant for the at least one trigger condition identified by said each rule. The first processing may include matching the trigger condition that has occurred to a trigger condition included in a first rule of the rules file, said first rule identifying a first portion of the navigation points in the navigational flow of the application described by the navigational structure file as relevant when the trigger condition occurs; and using first portion identified by the first rule to determine the customized user interface and the customized navigational flow of the application for the trigger condition that has occurred. Each navigation point of the application may be represented by a node in the hierarchical structure, and each navigation point may be associated with a content view. The hierarchical structure may form a tree structure of a plurality of nodes corresponding to a plurality of navigation points of the application. The tree structure may include a plurality of levels. Each of the plurality of levels may include one or more nodes. The tree structure may include a root node at first level and one or more nodes at one or more other levels, and one or more leaf nodes. A first content view may be associated with a first node that is not a leaf node and may represent a first navigation point of the hierarchical structure. The first content view may include a first user interface element which, when selected, results in navigation to a second content view associated with a second node representing a second navigation point of the hierarchical structure. The first node may be a parent node of the second node, and the second node may be a child node of the first node.

In accordance with another aspect of the invention is a computer readable medium comprising code stored thereon for user interface customization for an application, the computer readable medium comprising code for: receiving a navigational structure file including a description of a hierarchical structure describing a navigational flow of the application, said hierarchical structure including objects corresponding to different navigation points of the application whereby interaction with a user interface element causes transition or navigation from a first navigation point of the application to a second navigation point of the application as described in the hierarchical structure; determining whether any one of a defined set of one or more trigger conditions occurs; and responsive to determining an occurrence of a trigger condition in the defined set, performing first processing in accordance with the trigger condition that has occurred to produce a customized user interface displayed to a user and to produce a customized navigational flow of the application. The trigger condition that has occurred may be any of a defined state or condition of a system for which the application is used, setting a user-specified mode for a user, and an automatically determined mode in accordance with a role assigned to a user. The customized navigational flow may be determined in accordance with one or more portions of the navigational structure file determined as relevant to the trigger condition that has occurred. The defined state or condition of the system may be an error condition or state of the system. The user specified mode may be one of a plurality of defined modes each based on a set of one or more tasks performed by a user of a system for which the application is used.

BRIEF DESCRIPTION OF THE DRAWINGS

Features and advantages of the present invention will become more apparent from the following detailed description of exemplary embodiments thereof taken in conjunction with the accompanying drawings in which:

FIGS. 7, 8, and 21 are flowcharts of processing steps that may be performed in an embodiment in accordance with techniques herein

DETAILED DESCRIPTION OF EMBODIMENT(S)

Figure 1:
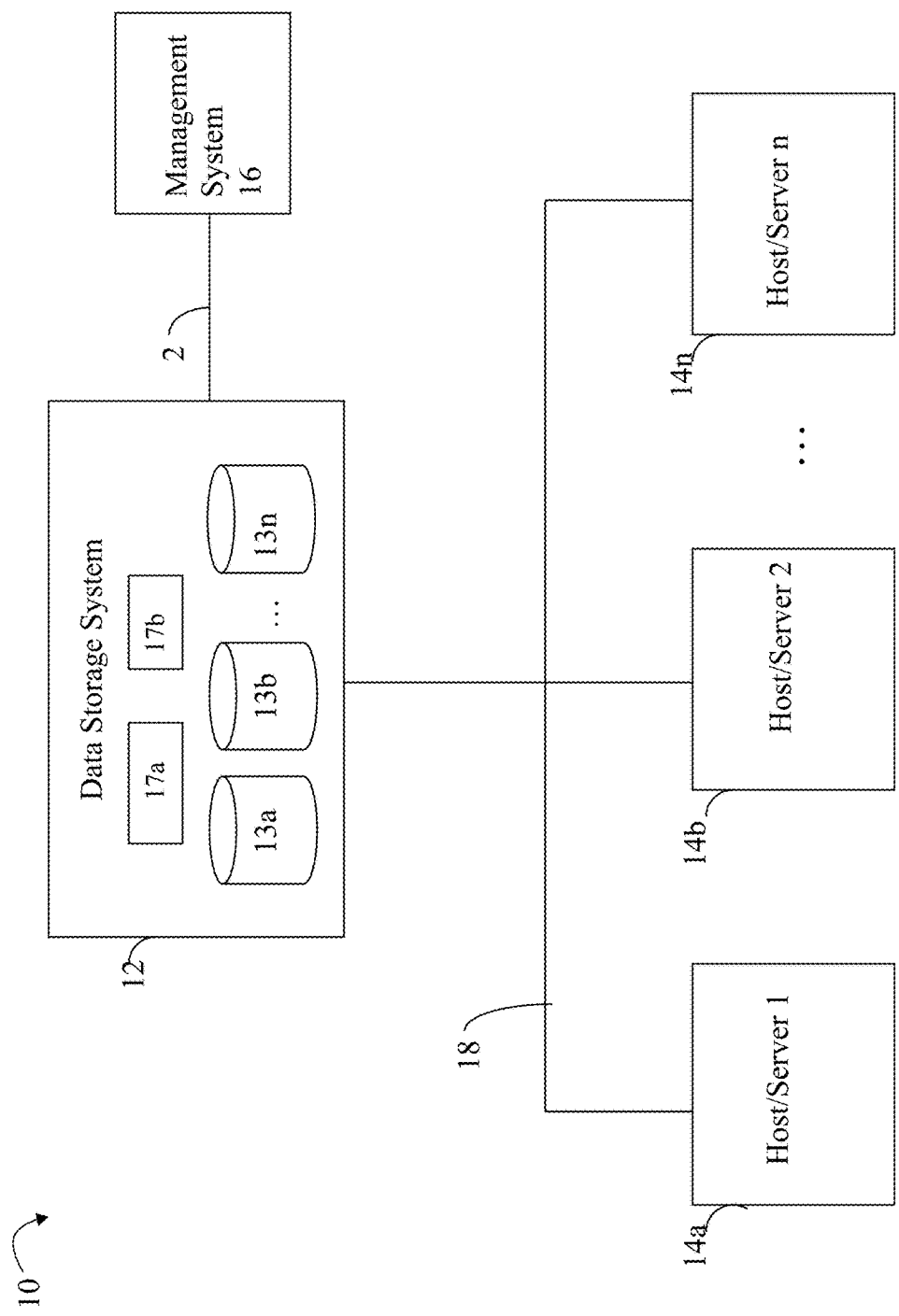
FIG. 1 is an example of an embodiments of a system that may utilize the techniques described herein.

Referring to FIG. 1, shown is an example of an embodiment of a system that may be used in connection with performing the techniques described herein. The system 10 includes one or more data storage systems 12 connected to server or host systems 14a-14n through communication medium 18. The system 10 also includes a management system 16 connected to one or more data storage systems 12 through communication medium 2. In this embodiment of the system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 2 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the system 10. In one embodiment, the communication medium 2 may be a LAN connection and the communication medium 18 may be an iSCSI or Fibre Channel connection.

Each of the host systems 14a-14n and the data storage systems 12 included in the system 10 may be connected to the communication medium 18 by any one of a variety of connections as may be provided and supported in accordance with the type of communication medium 18. Similarly, the management system 16 may be connected to the communication medium 2 by any one of variety of connections in accordance with the type of communication medium 2. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 2, a variety of different communication protocols may be used such as SCSI, Fibre Channel, iSCSI, and the like. Some or all of the connections by which the hosts, management system, and data storage system may be connected to their respective communication medium may pass through other communication devices, such as switching equipment that may exist such as a phone line, a repeater, a multiplexer or even a satellite. In one embodiment, the hosts may communicate with the data storage systems over an iSCSI or a Fibre Channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16, provision data storage system resources, and the like.

In one embodiment, the data storage systems 12 may include one or more data storage systems such as one or more of the data storage systems, such as data storage arrays, offered by EMC Corporation of Hopkinton, Mass. Each of the data storage systems may include one or more data storage devices 13a-13n, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12. It should be noted that each of the data storage systems may operate stand-alone, or may also be included as part of a storage area network (SAN) that includes, for example, other components such as other data storage systems. Each of the data storage systems may include a plurality of disk devices or volumes 13a-13n. The particular data storage systems and examples as described herein for purposes of illustration should not be construed as a limitation. Other types of commercially available data storage systems, as well as processors and hardware controlling access to these particular devices, may also be included in an embodiment.

In such an embodiment in which element 12 of FIG. 1 is implemented using one or more data storage systems, each of the data storage systems and management system 16 may include code thereon for performing the techniques as described herein.

Servers or host systems, such as 14a-14n, provide data and access control information through channels to the storage systems, and the storage systems may also provide data to the host systems also through the channels. The host systems may not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. An LV or LUN (logical unit number) may be used to refer to the foregoing logically defined devices or volumes.

The data storage system may be a single unitary data storage system, such as single data storage array, including two service processors or compute processing units. Techniques herein may be more generally use in connection with any one or more data storage system each including a different number of service processors than as illustrated herein. The data storage system 12 may be a data storage array, such as a VNX™ data storage array by EMC Corporation of Hopkinton, Mass., including a plurality of data storage devices 13a-13n and two service or storage processors 17a, 17b. The service processors 17a, 17b may be computer processing units included in the data storage system for processing requests and commands. In connection with performing techniques herein, an embodiment of the data storage system may include multiple service processors including more than two service processors as described. The VNX™ data storage system mentioned above may include two service processors 17a, 17b for performing processing in connection with servicing requests. Additionally, the two service processors 17a, 17b may be used in connection with failover processing when communicating with the management system 16. Client software on the management system 16 may be used in connection with performing data storage system management by issuing commands to the data storage system 12 and/or receiving responses from the data storage system 12 over connection 2. In one embodiment, the management system 16 may be a laptop or desktop computer system.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

Figure 2:
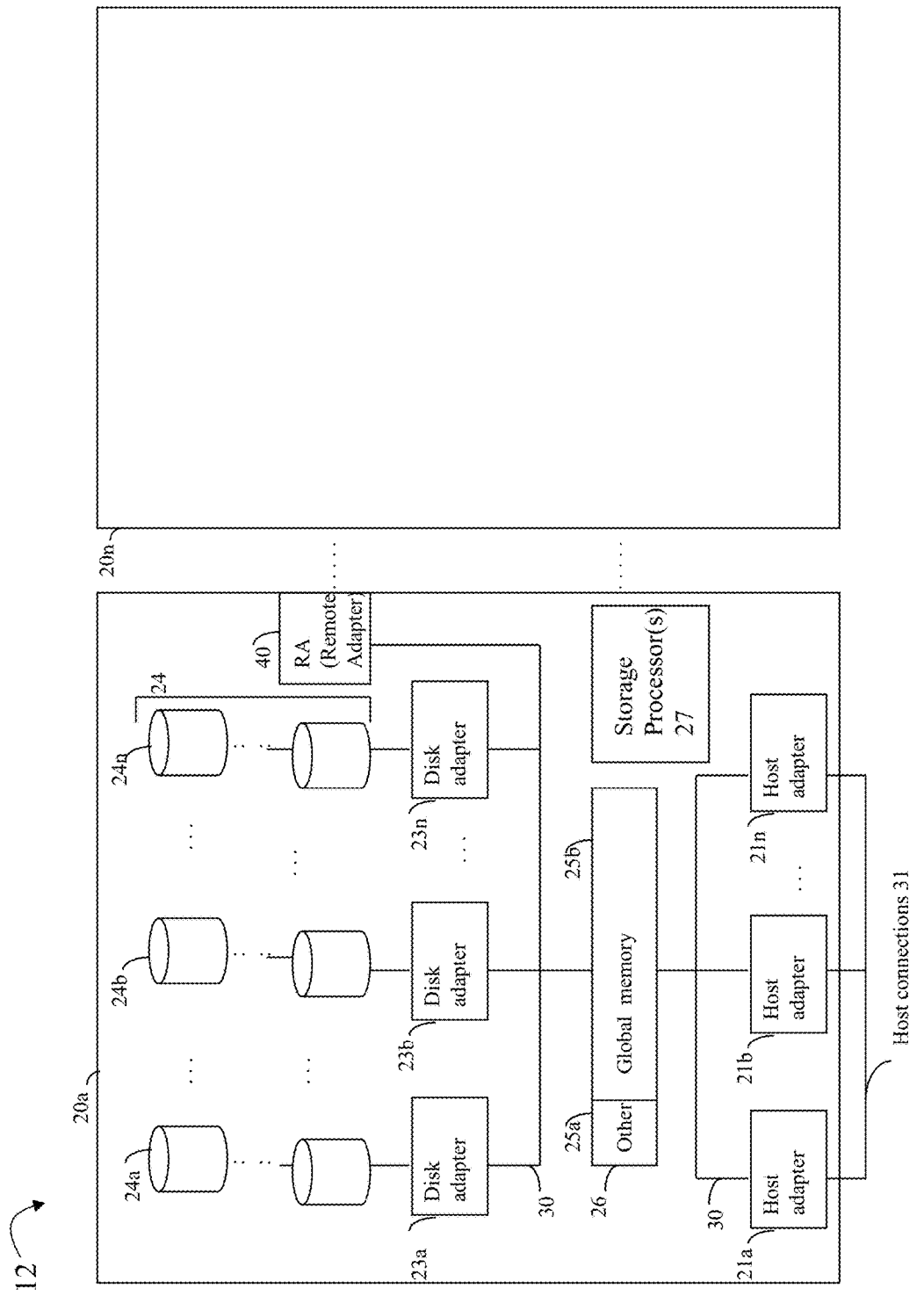
FIG. 2 is an example illustrating details of a data storage system in accordance with techniques herein.

Referring to FIG. 2, shown is an example of an embodiment of the data storage system 12 that may be included in the system 10 of FIG. 1. Included in the data storage system 12 of FIG. 2 are one or more data storage systems 20a-20n as may be manufactured by one or more different vendors. Each of the data storage systems 20a-20n may be a data storage array inter-connected (not shown) to other data storage array(s). Additionally, as noted above, the data storage systems may also be connected to the host systems through any one or more communication connections 31. In this example as described in more detail in following paragraphs, reference is made to the more detailed view of element 20a. It should be noted that a similar more detailed description may also apply to any one or more of the other elements, such as 20n, but have been omitted for simplicity of explanation.

Each of the data storage systems, such as 20a, may include a plurality of storage devices such as disk devices or volumes included in an arrangement 24 consisting of n rows of disks or more generally, data storage devices, 24a-24n. In this arrangement, each row of disks may be connected to a disk adapter ("DA") or director responsible for the backend management of operations to and from a portion of the disks 24. In the system 20a, a single DA, such as 23a, may be responsible for the management of a row of disks, such as row 24a. In a data storage system such as by EMC Corporation, a backend DA may also be referred to as a disk controller. The DA may performed operations such as reading data from, and writing data to, the physical devices which are serviced by the DA.

Also shown in the storage system 20a is an RA or remote adapter 40. The RA may be hardware including a processor used to facilitate communication between data storage systems, such as between two of the same or different types of data storage systems.

The system 20a may also include one or more storage processors 27. Each of the storage processors 27 may be CPU and an embodiment may include any number of such processors. For example, the VNX™ data storage system by EMC Corporation includes two storage processors. The system 20a may also include one or more host adapters ("HAs") or directors 21a-21n. Each of the HAs may be used to manage communications and data operations between one or more host systems and the global memory. In an embodiment, the HA may be a Fibre Channel Adapter (FA) or other adapter which facilitates host communication. The HA communicates with a component of the host such as a host bus adapter (HBA). Generally, directors may also be characterized as the different adapters, such as HAs (including FAs), DAs RAs and the like, as described herein. Components of the data storage system, such as an HA, which may communicate with a host may also be referred to as front end components. Within the data storage system, components, which may be characterized as backend components, communicate with a front end component. An example of a backend component is a DA. In connection with data storage systems such as by EMC Corporation, various types of directors or adapters may be implemented as a processor, or, more generally, a component that includes the processor. Examples of directors are disk adapters (DAs), host adapters (HAs), and the like.

One or more internal logical communication paths may exist between the DAs, the RAs, the HAs, and the memory 26. An embodiment, for example, may use one or more internal busses and/or communication modules. For example, the global memory portion 25b may be used to facilitate data transfers and other communications between the DAs, HAs and RAs in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

A configuration of a data storage system may be described by data storage configuration information. The data storage configuration information may describe various entities, attributes, and the like, about how the physical storage systems and devices are configured such as by a manager or system administrator. For example, the data storage configuration information may identify and describe LUNs, file systems, RAID groups, and the like, as may be formed using the physical data storage of the data storage system. With reference back to FIG. 1 in one embodiment, management software may be executing on the management system 16 where the user may be issuing requests in connection with reading and/or writing data storage configuration information that may be stored on physical storage device of the data storage system 12. More generally, the management system 16 may be referred to as a client issuing requests to the data storage system 12 which acts as a server to service the client requests (e.g., read and write requests) for data storage configuration information.

In general, a storage area network (SAN) may be characterized as a collection of data storage systems that are networked together via a switching fabric to a number of host computer systems operating as servers such as illustrated in FIG. 1.

Data storage management applications may include a graphical user interface (GUI) that enables a network manager to graphically manage, control, and configure various types of hardware and software resources associated with a corresponding managed storage area network and its data storage systems. The management application may execute, for example, on the management system 16 of FIG. 1. The management application may generate a graphical user interface utilized by a storage administrator to graphically select, interact with, and manage local or remote devices and software processes associated with the storage area network. Based on use of the graphical user interface in combination with an input device (e.g., tablet pen or stylus, hand operated mouse) and corresponding pointer displayed on a viewing screen or other display, a storage administrator is able to manage hardware and software entities such as file systems, databases, storage devices, volumes, peripherals, network data communications devices, etc., associated with the storage area network. Consequently, the storage management system 16 and associated management software enables a storage administrator (a person responsible for managing the storage network) to manage the storage area network and its resources.

One example of this kind of GUI includes a screen presentation that may include toolbars with accompanying menus and menu items as well as displays such as graphs, tables, maps or trees. The management application providing the GUI may be written in any suitable language such as JavaScript, Flex, and the like.

Described in following paragraphs are techniques that may be used in connection with web based GUI frameworks, such as may be included in the GUI of a data storage management application, which may use generic navigation code, such as of a navigation service. The navigation code may control the overall flow of the application (such as via UI navigation) and may support deep linking so that the user can make use of browser functionality such as the browser back/forward button and bookmark pages in context. In connection with the navigation service, techniques are described in following paragraphs that allow a payload (such as data in the form of one or more parameters) to be passed at each level within the deep linking since some working pages need additional context to function. Techniques herein may be used to reduce coupling of the working page (e.g., such as displayed by a web browser using code of an application's UI) and the navigation service (e.g., which may be characterized as generic and used in connection with multiple different applications and their UIs) so that the working page may be unaware of the navigation service. Techniques described in following paragraphs provide for automatically injecting the payload during page creation instead of the page pulling content from the navigation service. Additionally, techniques herein may provide for use customized GUIs and customized navigational flows based on an occurrence of a trigger condition such as related to the state or condition of the system being managed by the GUI application, a specialized user-specified mode and possibly other defined trigger conditions. This and other aspects are described in more detail below.

In connection with the above-mentioned techniques and embodiments thereof, a web browser or browser, such as Internet Explorer™ by Microsoft Corporation, Firefox, and the like, may be used to retrieve, process, and present resources. The resources may be web pages such as HTML (hyper text markup language) documents, as well images, videos, as other content. A resource that is a web page may be written in a language such as HTML whereby HTML may be characterized as a tag-based language. The browser does not display the HTML tags but rather uses the tags to interpret the contents of the page. The browser reads and interprets the HTML documents and composes or renders them into visible or audible web pages. In other words, the browser does not display the HTML tags, but uses the tags to interpret the content of the page. An HTML document may reference various resources which may be retrieved in connection with rendering the document for display as a webpage. The resources retrieved in connection with rendering the webpage may be identified using URLs (uniform resource locators) referenced within the HTML document. Thus, a first HTML document may reference or provide a link to a second HTML document, or more generally any second resource. For example, the HTML document may include appropriate HTML tags, such as the <a> tag (e.g., <a href="http://www.hyperlinkcode.com"> Hyperlink Code</a>), specifying a hyperlink to another second HTML document. The second HTML document may be retrieved and loaded into the web browser upon selection of the hyperlink. Hyperlinks allowing for connection between different web pages if a particular hyperlink is selected may be characterized as the navigational flow of an application. This is described in more detail elsewhere herein.

A web browser may be used in connection with requesting one or more resources, such as documents including various types of content for processing and/or display by the web browser. Generally, the web browser or browser may be characterized as a software application for retrieving, presenting, interpreting, traversing and/or processing information resources such as may be obtained from one or more internet locations or websites (e.g., servers or hosts have an IP address). A web page processed by the web browser may be a document or file, or more generally a resource, such as an HTML (hyper text markup language) file written in accordance with the HTML language that may include tags. The resource identified by a URL may be an HTML file or document, an image, a video, a multi-media file, an application (e.g., a resource including executable code or instructions), a script (e.g., containing instructions), or more generally, any allowable information or content that may be processed for use with the web browser in connection with rendering a web page. Each URL included in an HTML file may denote a resource which the web browser automatically requests from the identified location in the URL when processing the HTML file for display as a webpage in a window. As also known in the art, an HTML file such as processed by the browser may also include instructions in the form of a scripting language, such as JavaScript™.

A deep link may be characterized as a hypertext link to a resource or page on a website other than its homepage. The use of "deep" in this context of deep linking generally refers to the depth of the page in a site's hierarchical structure of pages. Any page, or more generally, content identified using a URL to identify the content location below the top page in the hierarchy (e.g., the home page) can thus be considered deep. For example, "www.xyz.home" may refer to a top level page or URL in a hierarchy and "www.xyz.home.level1" may be characterized as a deep link referring to a page or resource at a site at other than the top level.

To render a document such as an HTML page, most web browsers use an internal object model such as a document object model (DOM) (e.g., such as the DOM by W3C the World Wide Web Consortium). With DOM, the nodes of every document are organized in a tree structure, also referred to as the DOM tree, with the topmost node named "Document object". When an HTML page is rendered in a browser, the browser downloads the HTML into local memory and automatically parses it to display the page on a screen. The DOM is also a way in which JavaScript may transmit the state of the browser in HTML pages. A web browser may rely on a layout engine to parse input files, such as HTML and other input files, into a DOM. The DOM may be defined as a platform and language-neutral interface that allows programs and scripts to dynamically access and update the content, structure, and style of a document. The DOM may be characterized as an object model defining a logical structure of documents and the way a document is accessed and manipulated. The term "document" may be used to more generally represent many different kinds of information or data. XML and HTML, for example, present this data as documents, and the DOM may be used to manage this data. With the DOM, programmers can build documents, navigate their structure, and add, modify, or delete elements and content. For example, any object created as a result of executing statements of an HTML or XML document can be accessed, changed, deleted, or added using the DOM.

With the DOM, documents are modeled using objects, and the model encompasses the structure of a document and also the behavior of a document and the objects of which it is composed. As an object model, the DOM may be characterized as identifying the interfaces and objects used to represent and manipulate a document, the semantics of these interfaces and objects—including both behavior and attributes, and the relationships and collaborations among these interfaces and objects. For example, an input file such as an HTML file, processed by a browser may include a definition for a table having a particular structure, content and attributes. The DOM may be used to represent the content (e.g., data of table elements), structure (e.g., number of rows, columns) and style (e.g., attributes of displayed text as bold, font size, location of the table in a defined area of a display) of objects in the document such as the table. An embodiment may use a language, such as XML or HTML, to describe the objects corresponding to information rendered in a display by the browser.

Websites which are built on web technologies such as Adobe Flash and AJAX (Asynchronous JavaScript and XML) may not support deep linking This can result in usability problems for people visiting such websites. For example, visitors to these websites may be unable to save bookmarks to individual pages of the site, web browser forward and back buttons may not work as expected, and use of the browser's refresh button may return the user to the initial page. AJAX may be characterized as a group of interrelated web development (e.g., JavaScript and XML or JavaScript and JSON (JavaScript Object Notation)) technologies used on the client-side to create both synchronous and asynchronous web applications. With AJAX, web applications may, for example, can send data to, and retrieve data from, a server asynchronously (e.g., in the background) without interfering with the display and behavior of the existing page. Data may be retrieved, for example, by issuing HTTP requests. With AJAX, for example, HTML and CSS (Cascading Style Sheets, described elsewhere in more detail) may be used in combination to mark up and style information. Also, the DOM may be accessed with JavaScript to dynamically display, and to allow the user to interact with the information presented. JavaScript and the use of HTTP requests for specified data may be used for exchanging data asynchronously between browser and server to avoid full page reloads. JSON is a text-based open standard designed for human readable data interchange based on the JavaScript scripting language for representing objects. As noted above, JSON may be used an alternative to XML.

Dynamic HTML (DHTML) may be characterized as a term referring to a collection of technologies used together to create interactive and animated websites using a combination of a static markup language (such as HTML), a client-side scripting language (such as JavaScript), a presentation definition language (such as CSS or cascading style sheets), and the DOM. DHTML allows scripting languages to change variables in a web page's definition language, which in turn affects the look and function of otherwise "static" HTML page content, after the page has been fully loaded and during the viewing process. Thus the dynamic characteristic of DHTML is the way it functions while a page is viewed, not in its ability to generate a unique page with each page load. DHTML allows for use of a scripting language, for example, to change the DOM, to change associated style, and/or to change displayed content. As noted above, DHTML may be characterized collectively as a product of related and complementary technologies such as, for example, HTML, Cascading Style Sheets (CSS), and Javascript. To allow scripts and components to access features of HTML and CSS, the contents of the document may be represented as objects in a programming model such as the DOM.

The DOM may include an API (application programming interface) providing a structured interface that allows access and manipulation of virtually anything in the document. The HTML elements in the document are available as a hierarchical tree of individual objects, meaning you can examine and modify an element and its attributes by reading and setting properties and by calling methods. The text between elements is also available through DOM properties and methods. The DOM also provides access to user actions such as, for example, pressing a key and clicking the mouse. Such actions may be examples of events that may be intercepted and processed by registered event handler functions and routines. The event handler receives control each time a given event occurs and can carry out any appropriate action, including using the DOM to change the document.

Styles may be generally characterized as attributes of different elements that may be described in an HTML file whereby styles relate to how to display or affect visual aspects of such elements. For example, styles relate to font, color, whether to bold, and the like. CSS refers to external style sheets where style information (e.g. formatting and appearance) may be specified in files separate from HTML files using such style information. Dynamic styles, such as using CSS, may provide for modifying the appearance and formatting of elements in a document without adding or removing elements. The DOM may also provide programmatic access to styles. This means a programmer may change inline styles on individual elements and change style rules using script-based programming. These scripts can be written in any language supported by the target browser, such as JavaScript, Microsoft JScript, or Microsoft Visual Basic Scripting Edition (VBScript). Inline styles are CSS style assignments that have been applied to an element using the style attribute. A programmer may examine and set these inline styles by retrieving the style object for an individual element. For example, to highlight the text in a heading when the user moves the mouse pointer over it, the style object may be used to enlarge the font and change the color of displayed text.

Data binding is a DHTML feature for binding individual elements in a document to data from another source, such as a database or comma-delimited text file. When the document is loaded, the data is automatically retrieved from the source and formatted and displayed within the element. For example, data binding may be used to automatically and dynamically generate tables in a document such as by binding a table element to a data source. When the document is viewed, a new row is created in the table for each record retrieved from the source, and the cells of each row may be filled with text and data from the fields of the record. Because this generation is dynamic, the user can view the page while new rows are created in the table. Additionally, once all the table data is present, scripting code in the document may be used, for example, to manipulate (e.g., sort or filter) the table data without requiring the server to send additional data. The table may be regenerated using the previously retrieved data to fill the new rows and cells of the table. As another example, data binding with DHTML may be used to bind one or more elements in the document to specific fields of a given record or form. When the page is viewed, the elements are filled with text and data from the fields in that record, sometimes called the "current" record. The user of the UI may view the content also change that content by changing the settings and values of the form. The user can then submit these changes so that the new data is uploaded, for example, to a server.

In accordance with techniques herein, an embodiment may provide for dynamically updating the contents of a web page making calls as needed to the server to obtain such contents without reloading, changing, and/or refreshing the current web page. An embodiment may use a navigation services described in more detail below and may use DHTML techniques and technologies to perform the foregoing dynamic updating of different aspects of the current web page. For example, the DOM of the current page may be modified and the content of the page may be modified. As needed, content may be retrieved from the server. Additionally, an embodiment in accordance with techniques herein may use metadata to optionally specify alternative views and a default view for displaying information for particular navigation points of the application. Furthermore, an embodiment may allow for user preferences and user configurable data displays to customize how data at different navigation points is displayed for a user. User preferences for a user may indicate one of the available alternative views as the one to use when displaying data for that particular user on a per navigation point basis or level of granularity.

Figure 3:
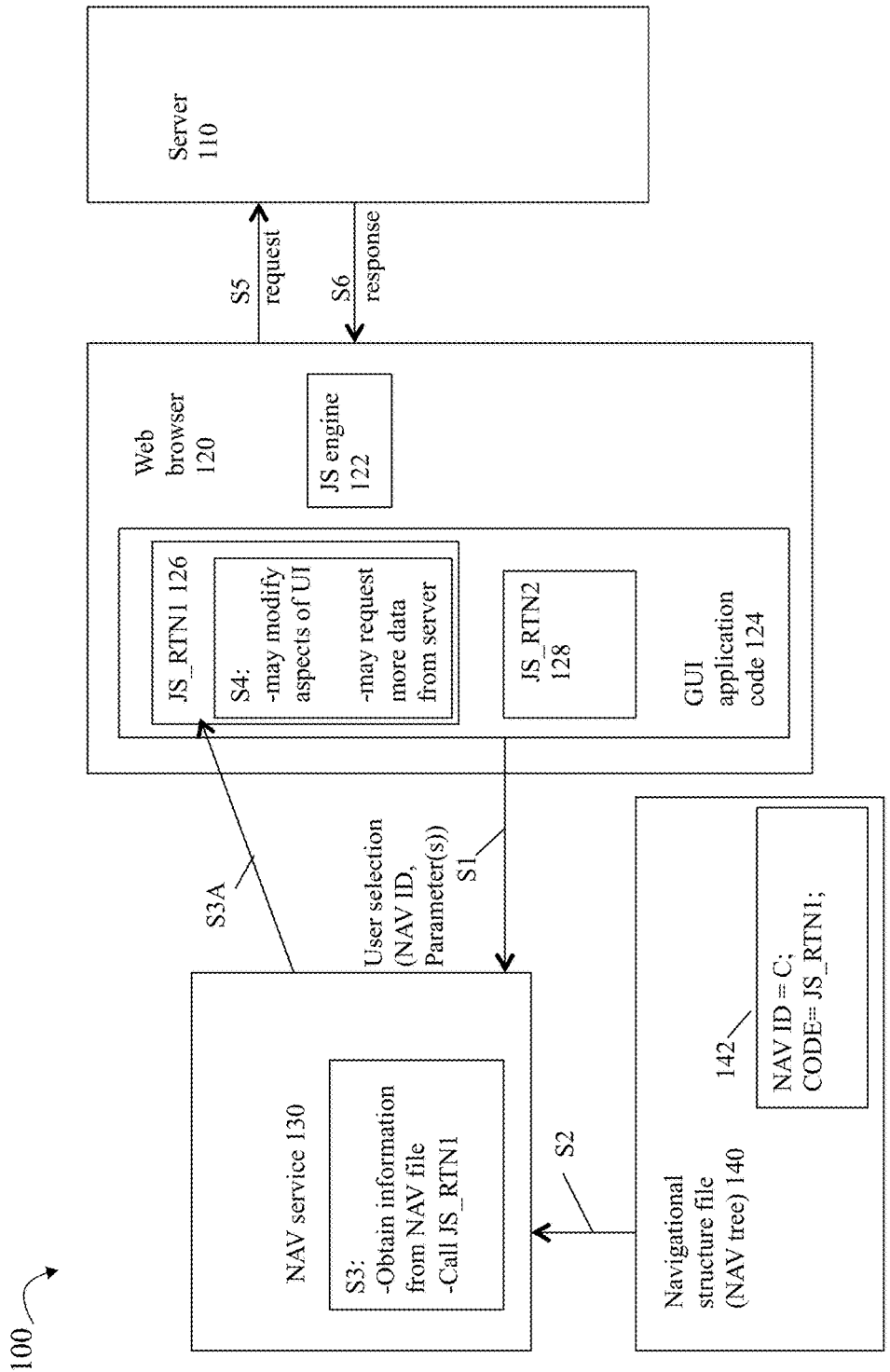
FIG. 3 is an example illustrating components and associated data flow that may be performed in an embodiment in accordance with techniques herein.

Referring to FIG. 3, shown is an example 100 of components that may be included in a system for use with techniques herein. The example 100 includes a navigational (NAV) service 130, a navigational structure file 140, a web browser 120 and a server 110. In one embodiment, the components 120, 130 and 140 may all reside in a single computer system, such as the management system 16 of FIG. 1. The components 120, 130 and 140 may be included in a client application, such as the data storage management application. More specifically, the management application may include GUI application code 124 which is executed by a web browser. For example, the GUI application code 124 may include JavaScript code which runs in the browser 120. The browser 120 may include a JavaScript (JS) engine 122 which performs processing to parse, interpret and execute the GUI application code 124. The management application including GUI application code 124 may have a navigational structure or application flow as described in the NAV structure file 140 which will be described in more detail below. The management application including GUI application code 124 for providing the application's GUI through the browser 124 may use the NAV service 130 and the NAV structure file 140 to provide for navigation control flow through the management application thereby responding to events generated due to user selections and interactions with the GUI displayed in the browser 120. The NAV service 130 may be characterized as a generic service or generic navigation code that may be utilized by the GUI of the management application, as well as more generally any application having its navigational structure and flow described in 140, to provide for navigation control flow through the application thereby responding to events generated due to user selections and interactions with the GUI displayed in the browser 120. In following paragraphs reference may be made to the particular data storage management application and its GUI code 124 (also referred to as a client) being used to manage a server 110 that represents one or more data storage systems. However, the techniques described herein using the NAV service 130 and GUI code of the application may be used, more generally, in connection with any application functioning as a client and any server.

The GUI application code 124 may include multiple code modules or components (e.g., different dialogues, wizards, and the like) of the UI written by different developers such as to support different GUI features. For example, as described in more detail below, the application's UI may be partitioned at a high level into multiple navigational sections whereby each such section may include a portion of the overall navigational flow of the GUI. Within each navigational section, a user may interact with the GUI causing traversal or navigation between different navigation points each causing display of different content, UI elements, and the like, also referred to herein as a content view. Thus, the selection or interaction of a user with a UI element may function as a navigational link between different navigation points each having different associated content views displayed in response to UI navigation to each particular navigation point. The application's entire navigational structure may be described in the NAV structure file 140 which may link together the various UI navigational flows or paths that may be taken by a user interacting with the application's GUI. For example, a user may make a series of menu selections, select particular links, and other UI interactions each resulting in display of different content views. The NAV structure file 140 may thus be characterized as describing the application's UI navigational flow that may include multiple components of the UI. In this manner, the NAV structure file 140 may tie together the overall application GUI navigational flow with the individually developed navigational sections (and portions thereof) including different code portions used to generate different content views whereby each such code portion may be navigationally unaware of other content views and/or the overall navigational flow described by NAV structure file 140.

Although following paragraphs may provide exemplary uses of techniques herein with data storage management, it will be appreciated by those skilled in the art that techniques herein have broader use and applicability, more generally, with any type of UI having associated content views displayed. For example, techniques herein may be generally used with any application having a UI with a workflow reflected in connection with a series UI elements (e.g., such as menus, tabs, buttons, data input fields, and the like), the different user responses and selections, and the resulting UI content views displayed in response to such various user inputs and selections from such UI elements. The foregoing may be represented in a hierarchal manner of different UI content views displayed in response to user inputs and/or selections for displayed UI elements.

A content view may be characterized as what data or content is displayed and how such data is represented in connection with a UI at a point in time. The data or content may include, for example, a list of detailed information about a single host or single LUN. Depending on the particular detailed information, the list of detailed information may be displayed on the UI in any one of a variety of different UI elements or structures such as a table, chart, graph, menu list, and the like. Further a particular UI element, such as a menu or selection button may further be represented in different ways based on other attributes. For example, a menu may be a drop down menu, or the menu items may rather be displayed as a set of tabs. A table may have different display options related to spacing, sizes, borders, whether text is bolded or in a particular font, and the like. A displayed UI element in a first content view, when selected, may also provide a link to another second UI content view. Collectively, such information regarding the data or content and how to display or visually represent the content on a UI display may be referred to as a content view. Each different UI displayed, such as in response to a menu selection, may be characterized as having its own UI content view. As such, the series of UI displays in response to selecting a sequence of one or more UI elements (e.g., in response to a selection, button selection, and the like) may be represented as a work flow, navigational flow, or path originating from the first UI display. Each node in the path corresponds to a UI display or a UI content view. The possible paths, where each node in a path has a corresponding UI content view, may be represented in a hierarchical structure such as a tree. The NAV structure file 140 may describe the foregoing hierarchical structure or tree of the UI navigational flow. A user may navigate from a source UI content view to a target UI content view by selecting or otherwise interacting with one of the UI elements that may be included in the source UI content view. In this manner, the foregoing one UI element may serve as a navigational UI link to the target content view.

The application's navigational structure may be specified in the NAV structure file 140 and provided as an input to the NAV service 130 during runtime when executing the application and its GUI code 124. During runtime of the application at its GUI code 124, a user may make a selection or otherwise interact with a UI element of the GUI causing generation of a navigation event. The UI element may be displayed in a current content view whereby selection or user interaction with the UI element may denote a UI navigation to a target content view. It should be noted that the target content view and associated target navigation point may be different from a current content view and current navigation point in the application, such as, for example, when a user navigates to a different page or location of the application. Alternatively, the target content view and target navigation point may be the same, respectively, as the current content view and current navigation point of the application such as, for example, where the user enters data or makes a selection within a currently displayed page that does not result in navigation to a new location or navigation point in the application.

The NAV service may be registered to receive notification of such UI events. In a step S1, the web browser may therefore notify the NAV service regarding the occurrence of a navigational, or more generally, a particular UI event. The web browser may also include context information in the notification of S1, such as any particular UI element selected within a current display and any associated data. The particular UI element selected may be mapped by the NAV service 130 to a particular navigation point or node in the NAV structure file thereby denoting that selection or interaction with that particular UI element denotes a navigational transition to a target navigation point of the NAV structure file 140. The context information in S1 passed from the browser 120 to the NAV service 130 may therefore include a navigational identifier (NAV ID) denoting the foregoing UI element causing navigation or transitioning from a current navigation point to a new location, the target navigational point, denoted by NAV ID. Thus, the NAV ID may be associated with a target content view. Additionally, the context information may include one or more parameters (params). The params may include, for example, information identifying a menu item selected, an input value such as input through a dialogue or field in a form, a particular item (e.g., row, column, entry) of a selected table item, and the like.

It may also be the case where the UI event does not cause navigation to a new location (e.g., the source or current navigation point in the application is the same as the target navigation point denoted by NAV ID) and the parameters may indicate a UI selection or data input by the user.

In a step S2, the NAV service 130 may obtain information from the NAV structure file 140 associated with the target navigation point denoted by NAV ID received in the context information of S1. In particular, the information obtained from the NAV structure file 140 may identify a target body of code (e.g., routine, function, method and the like) within the GUI application code 124 invoked to further process the UI navigational event associated with the transition or navigation from the current navigation point to a target navigation point denoted by NAV ID. Although not illustrated in FIG. 3, the information obtained from the NAV structure file 140 for the target navigation point NAV ID may also optionally include other information depending on the embodiment.

With reference to FIG. 3, element 142 may represent the information obtained from the NAV structure file 140 when the target navigation point has a NAV ID of C. The file 140 may further identify that the target body of code in the GUI application code 124 is JS_RTN1 (denoted by element 126).

In a step S3, the NAV service 130 may obtain the foregoing information from the NAV structure file 140, perform any other necessary processing, and then transfer control in step S3A to the target body of code JS_RTN1 126 in the GUI application code 124. In connection with the transfer of control in S3A, any necessary information, such as in the form of parameters, may also be provided to the JS_RTN1 126. The target body of code JS_RTN1 126 may perform processing in step S4 including modifying aspects of the UI. Such modification may include, for example, dynamically modifying the DOM (e.g., create new layouts or structures such as a new table, modify an existing structure, create new UI elements, and the like). Such processing in step S4 for modifying aspects of the UI may include, for example, modifying styles or attributes affecting visual display of currently displayed elements. Such processing in step S4 for modifying aspects of the UI may include, for example, requesting additional data S5 which is then returned S6 from the server 110. Some or all of the returned data may then be included as content displayed in the UI for the target navigation point. Some or all of the returned data may be further processed (e.g., by the target body of code JS_RTN1 126 or other code of the GUI application code 124) so that resulting or derived data generated as an output of the processing may be included as content displayed in the UI for the target navigation point having a target content view.

To further illustrate the processing just described such as in connection with the first point in time mentioned above, a user may make a UI selection (e.g., such as by selecting a button, tab or menu item) to view a table of information, such as a list of physical or logical entities of the data storage system (server 110). The table of such entities may be, for example, physical storage devices, logical devices or hosts. The NAV service 130 may be notified regarding the UI selection in step S1 denoting a transition or navigation from a current navigation point to a target navigation point. The target navigation point may be identified by NAV ID and have a content view including the table of information (where table is the default view). Using the NAV ID, the NAV service 130 may obtain information represented by 142 from the NAV structure file 140 and perform step S3 and then transfer control S3A to target body of code JS_RTN1 126. The target body of code may perform processing to request S5 from the server 110 information regarding the entities for inclusion in the table. The server 110 may return the requested information in a response S6 to the web browser for use by the target body of code (JS_RTN1 126) of the GUI application code 124. The code 126 may then perform processing to modify the DOM such as to create a new table and populate the new table with the information returned in the response of S6. The new table may then be included in the content displayed on the GUI for the target navigation point. In this manner, NAV service facilitates UI navigation by invoking a target body of code in the GUI application code 124 and using techniques herein for providing alternative view information for use by the target body of code.

In connection with the processing performed in S4 by the target body of code, such as JS_RTN1 126 of FIG. 3, it should be noted that generally the DOM may be manipulated before and/or after any desired information is requested, such as from the server. For example, the DOM may be updated to display a table in the process of loading (e.g., with a loading spinner). The information may be loaded from the server and then stored in the table for display whereby the loading spinner is then removed. More generally, the particular ordering in which steps may be performed by the target body of code in connection with particular examples herein should not be construed as a limitation or requiring that particular order. Such variations will be appreciated by those skilled in the art.

It should be noted that the GUI application code 124 may or may not send any request(s) to the server 110 for information (e.g., may optionally perform S5, S6 as needed for the particular event, UI and application). Whether such requests are performed in S5 may vary with the particular UI event being processed and the information to be displayed. For example, as a simple illustration, the params communicated in S1 to the NAV service 130 may include two numeric inputs specified by the user whereby such numeric inputs may be further communicated to JS_RTN1 126 in S3A as the target body of code. The code 126 may perform processing of the two numeric inputs, such as add the two numbers, multiply the two numbers, and the like, generating a single numeric output representing the result of the mathematical operation. The numeric output may be included in the displayed content of the UI. The code 126 may dynamically modify the DOM as needed to include an element or object for the numeric output with suitable styles or attributes. However, the code of 126 may perform processing to dynamically update aspects of the GUI to include the foregoing result without requesting further information from the server 110.

Figure 3A:
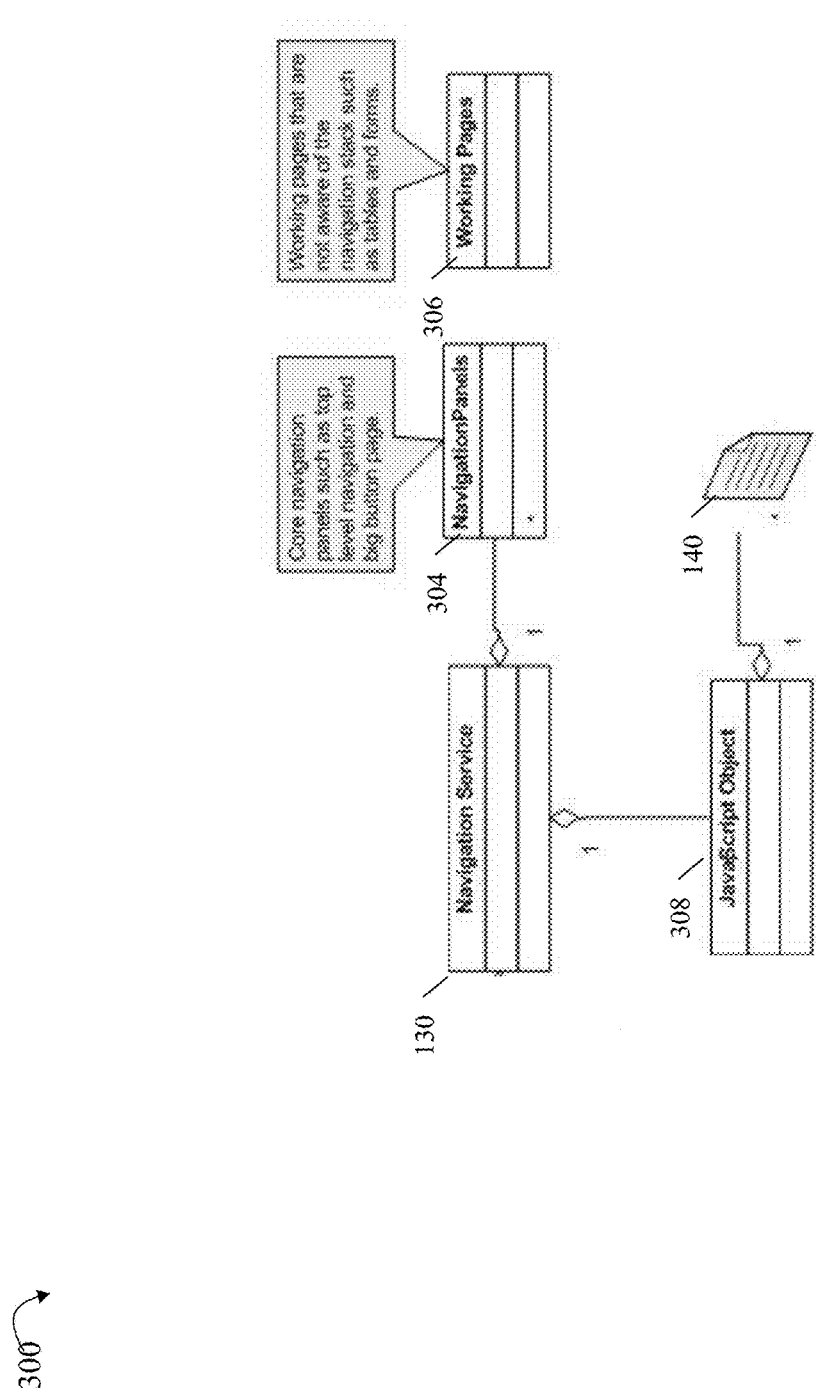
FIG. 3A is an example illustrating a high level design of entities that may be used in an embodiment in accordance with techniques herein.

In one embodiment details of which are further described below, the NAV structure file 140 may be a JSON file describing the application overall layout and navigational flow. The NAV service 130 may include JavaScript code and use an internal representation using JavaScript objects. With reference to FIG. 3A, information from the JSON file 140 such as related to a target navigation point having a NAV ID may be used to generate a JavaScript object 308 used by the NAV service 130. With the NAV service 130, information regarding core navigational panels 304 may be provided. Element 304 may represent, for example, top level navigational panels such as top level UI navigational sections of the application represented in the JSON file 140. Element 306 may represent that additional working pages or displayed content views not aware of the navigation stack such as tables and forms. In other words, element 306 may represent the content views corresponding to navigational points represented in the file 140 where code of the GUI application code 124 invoked to create such content views may be characterized as creating working pages (content views) which are not navigation aware.

It should be noted that JS_RTN2 128 of FIG. 3 may denote another body of code of the GUI application code 124. Element 128 is described in connection with other examples in following paragraphs and may perform processing similar to that as described herein connection with element 126.

Figure 4:
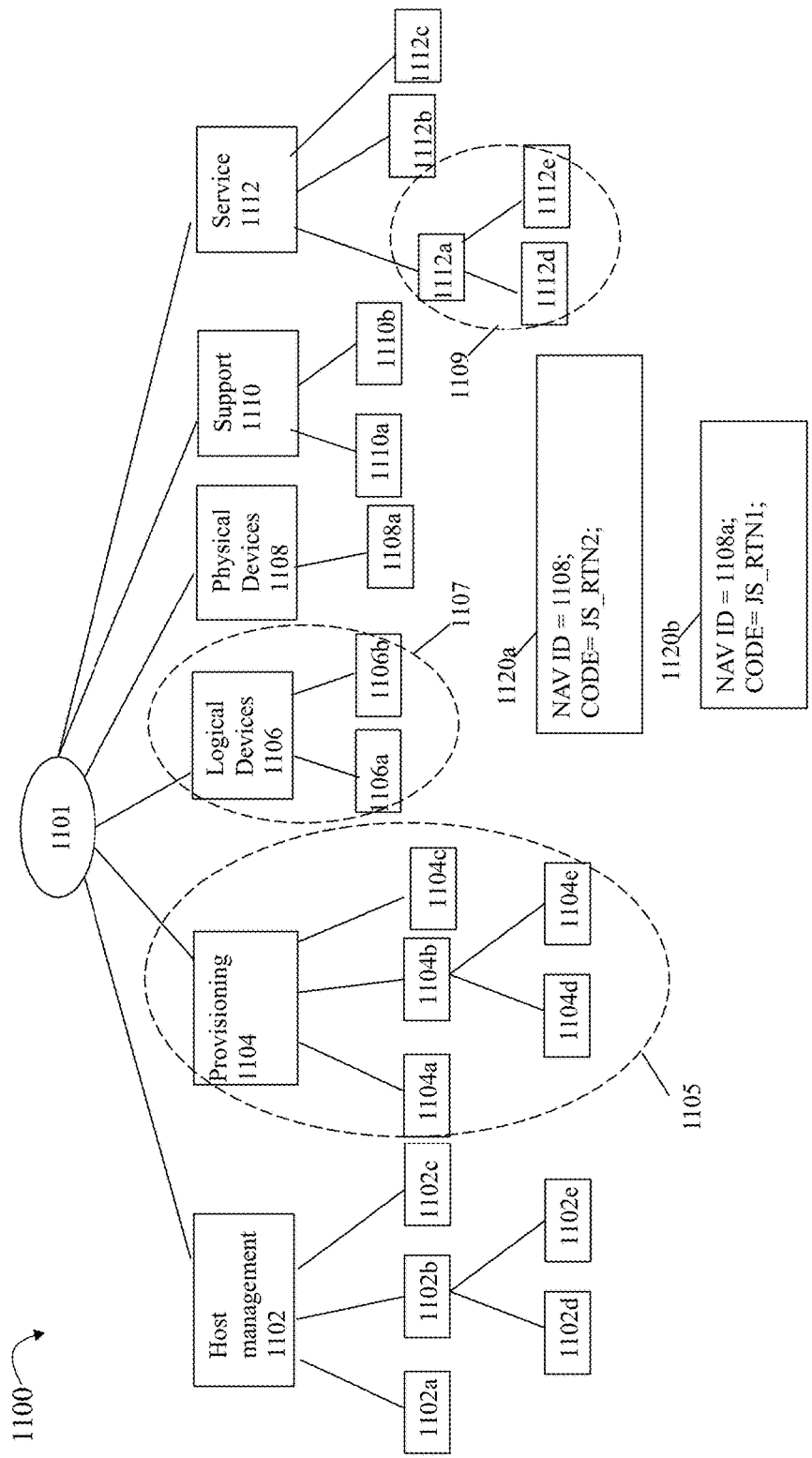
FIG. 4 is an example of a hierarchical structure and associated information that may be included in a navigational structure file in an embodiment in accordance with techniques herein.

Referring to FIG. 4, shown is an example of a hierarchical structure regarding an application's navigational UI flow that may be represented by information included in the NAV structure file 140, such as a JSON file mentioned above. The example 1100 illustrates a hierarchical structure corresponding to UI content views (e.g., portions of a display or pages) that the user may navigate from and to, such as in connection with a data storage management application. The structure 1100 in this example forms a tree having a root node 1101 at level 0, nodes 1102, 1104, 1106, 1108, 1110 and 1112 at level 1, nodes 1102a-c, 1104a-c, 1106a-b, 1108a, 1110a-b and 1112a-c at level 2, and nodes 1102d-e, 1104d-e, 1108d-e and 1112cd-e at level 3. The example 1100 also includes examples 1120a-b of additional data that may be defined for each node in the tree structure having root 1101 Each node in the structure may be associated with a unique NAV ID as described herein. For example, element 1120a illustrates additional information that may be specified in the file 140 for the node having NAV ID 1108, and element 1120b illustrates additional information that may be specified in the file 140 for the node having NAV ID 1108a. Although information 1120a and 1120b are only illustrated for 2 nodes for simplification in illustration, information may be similarly included in the file 140 for each node of the NAV structure having root 1101. Elements 1120a and 1120b may include information similar to element 142 of FIG. 3.

A node at level N may have child nodes connect to it at level N+1. For example, nodes 1102a-c are child nodes of node 1102 and node 1102 is the parent node of child nodes 1102a-c. A node which has no child nodes is also a leaf node. A path may be defined from the root at level 0 to a second node at another level greater than 0 in the hierarchy whereby the path includes the root node and any intervening nodes traversed from the root to reach the second node. For example, a path may defined by 1101, 1106, 1106b. A second path may be defined by 1101, 1108 1108a. More generally, a path may be defined between two nodes in the tree as follows: a path between a first node at level N to a second node at a level M>N may represent a navigational path through UI displays of each node on the path. A first node may be a descendant of a second node if the second node is included in a path from the root to the first node (e.g., there are one or more intervening nodes connecting the second node to the first node where each node in the path is at a different level in the hierarchy).

Element 1101 is the root denoting that initially, the UI display may include a content view with a first level of menu options, buttons or other UI elements for host management 1102, provisioning 1104, logical devices 1106, physical devices 1108 and support 1110. Thus the nodes 1102, 1104, 1106 and 1108 at level 1 may represent the major partitioned navigational sections of the UI displays. Each of the nodes in levels 2 and 3 may represent a UI content view that may be rendered in connection with UI navigation. A user may navigate to a UI content view corresponding to a first node at level 2 by selecting the UI element corresponding to the first node's parent at level 1. A user may navigate to a UI content view corresponding to a first node at level 3 through the first node's parent at level 2. Leaf nodes, such as 1102d, 1102e, 1102c, 1104a, 1104d0e, 1104c, 1106a-b, 1108a, 1110a-b and 1112ac-d may represent content views having no links to other content views as represented by the fact that there is no further link from such leaf nodes to any other node in the tree.

A user may select a UI element associated with any one of 1102, 1104, 1106, 1108, 1110 and 1112 and result in rendering another UI content view associated with a child node of the selected node. For example with reference to FIG. 5, element 1201 may illustrate the initial UI content view corresponding to the root node 1101 including 6 UI elements 1201a-f such as buttons for host management, provisioning, logical devices, physical devices, support and service of the data storage system. In this example, selecting host management 1201a may result in a UI content view of 1202 corresponding to the node 1102 in FIG. 4. The UI content view 1202 may include 3 hyperlinks or other navigational links (such as in connection with navigating in a browser)—LINK1, LINK2, and LINK3. Selection of LINK 1 of 1202 may result in UI navigation to UI content view 1202a. Selection of LINK 2 of 1202 may result in UI navigation to UI content view 1202b having two links LINK4 and LINK 5. Selection of LINK 4 of 1202b may result in UI navigation to UI content view 1202d. Selection of LINK 5 of 1202b may result in UI navigation to UI content view 1202e. Selection of LINK 2 of 1202 may result in UI navigation to UI content view 1202c.

UI content views and associated UI elements associated with a single application may be partitioned into major navigational sections of the hierarchy as illustrated by the 6 groupings at level 1 of FIG. 4. Each of 1101a-f of FIG. 4 may generally represent any UI elements of the initial content view 1201 that a user may interact with causing transition or navigation to another content view. Thus, LINKS 1-3 of 1202 may be characterized as UI elements providing navigational links to other target content views 1202a-c from a current content view 1202 and LINKS 4-5 of 1202b may be characterized as UI elements providing navigation links to other target content views 1202d-e.

Figure 5:
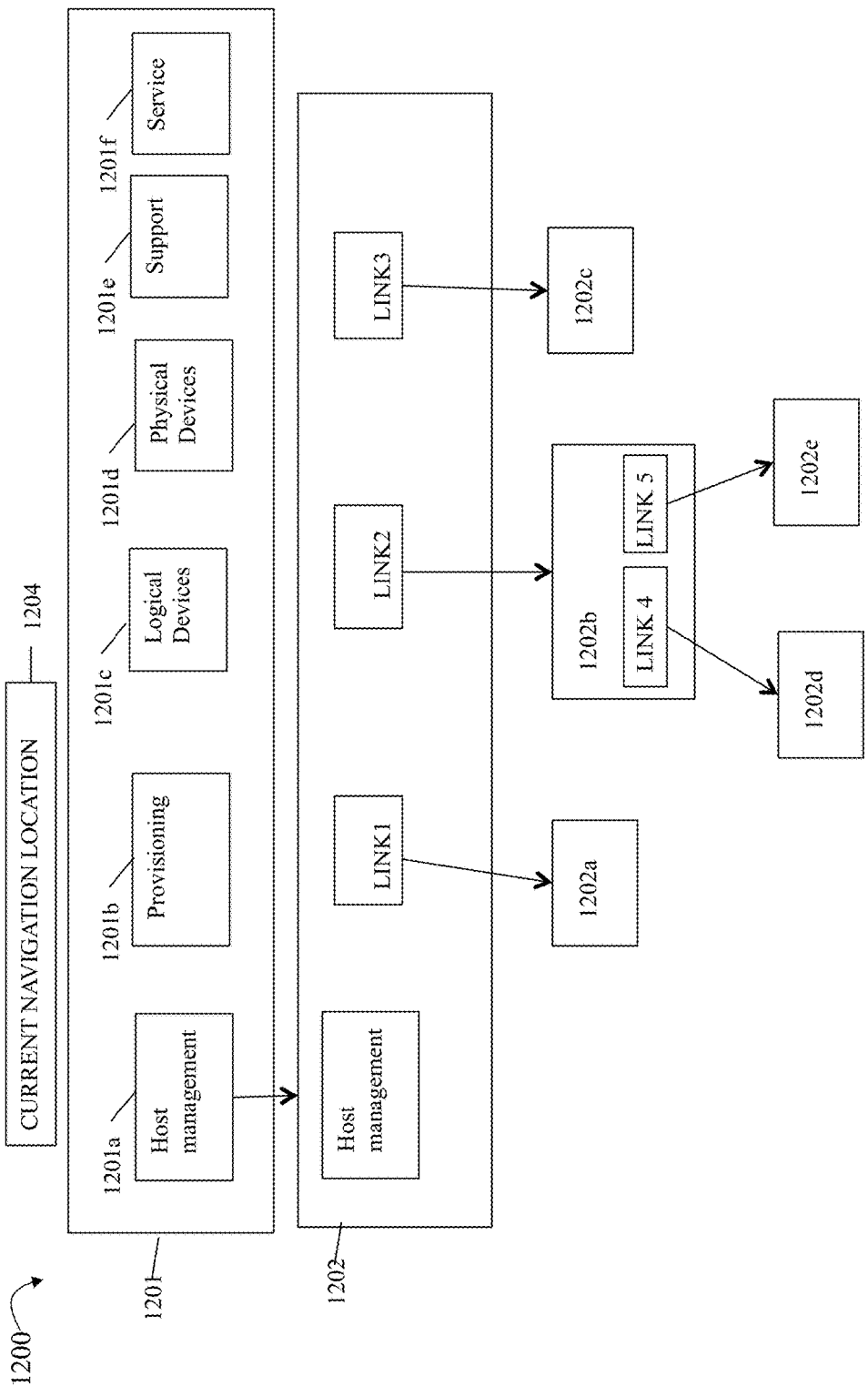
FIGS. 5-6 are examples illustrating different navigational flows and associated content views of different navigation points of an application in an embodiment in accordance with techniques herein.

The example 1200 of FIG. 5 indicates that the content views 1202d-e corresponding, respectively, to leaf nodes 1102d-e of FIG. 4 may include no UI elements providing links to other content views since, as represented in FIG. 5, such leaf nodes 1102d-e have no child nodes.

With reference back to FIG. 4, each node in the tree may represent a navigation point and associated content view within the application. A first navigation point may correspond to a parent node having a first content view. The parent node may have a child node representing a second navigation point for a second content view. A user may navigate from the first content view to the second content view by selecting a UI element included in the first content view. It should be noted that the rendered content may not completely change of update each time a UI element is selected. For example, the rendered content in the entire UI display at a point in time may collectively be the net result of a current or last selected UI element as well as one or more prior UI element selections. Selecting a menu option or button, for example, may result only in updated a portion of the display with a new content view. In this manner, the resulting display may include the new content view along with possibly one or more other content views or portions of such other content views.

With reference to FIG. 5, a UI display may include a UI element 1204 providing the current navigation point as a current navigation location within the hierarchy of nodes representing the different navigation points for the application. For example, after selecting 1201a, the current navigation location in 1204 may be "application.HostManagement" denoting the current navigation point as node 1102 of FIG. 4.

Referring back to FIG. 3, the techniques described herein may be generally used in connection with a client and server where the client may make API calls such as in the form of requests to the server. In one embodiment, the GUI application code 124 may be executed on browser 120 of a client whereby the code 124 may be JavaScript loaded from server 110. The client may be rendering a GUI in the browser 120. When processing is performed to transition or navigate between content views, the client may not load new JavaScript or HTML from the server to render each new content view (e.g., working page). In accordance with techniques herein, the GUI application code 124 may be generally written using AJAX technologies (including JavaScript) whereby any data, if needed, may be requested and obtained from the server using AJAX calls to load the data and dynamically change the DOM and other aspects of what is being rendered in the browser. The code of the GUI application 124 may be characterized as using DHTML technologies and techniques known in the art and also mentioned herein to dynamically modify the DOM and perform any necessary call(s) to the server to obtain data for display without refreshing the page. Using DHTML techniques, JavaScript may be used to dynamically modify the existing HTML code and associated structure of the DOM which may be populated with new data obtained from the server without requesting and obtaining an entirely new web page. Techniques herein may dynamically manipulate the DOM defining the document body of the displayed web page, for example, to dynamically add and remove objects from the DOM. The client-side executing JavaScript may create and/or modify objects or elements of the DOM on the client dynamically and perform AJAX calls to obtain data.

Figure 6:
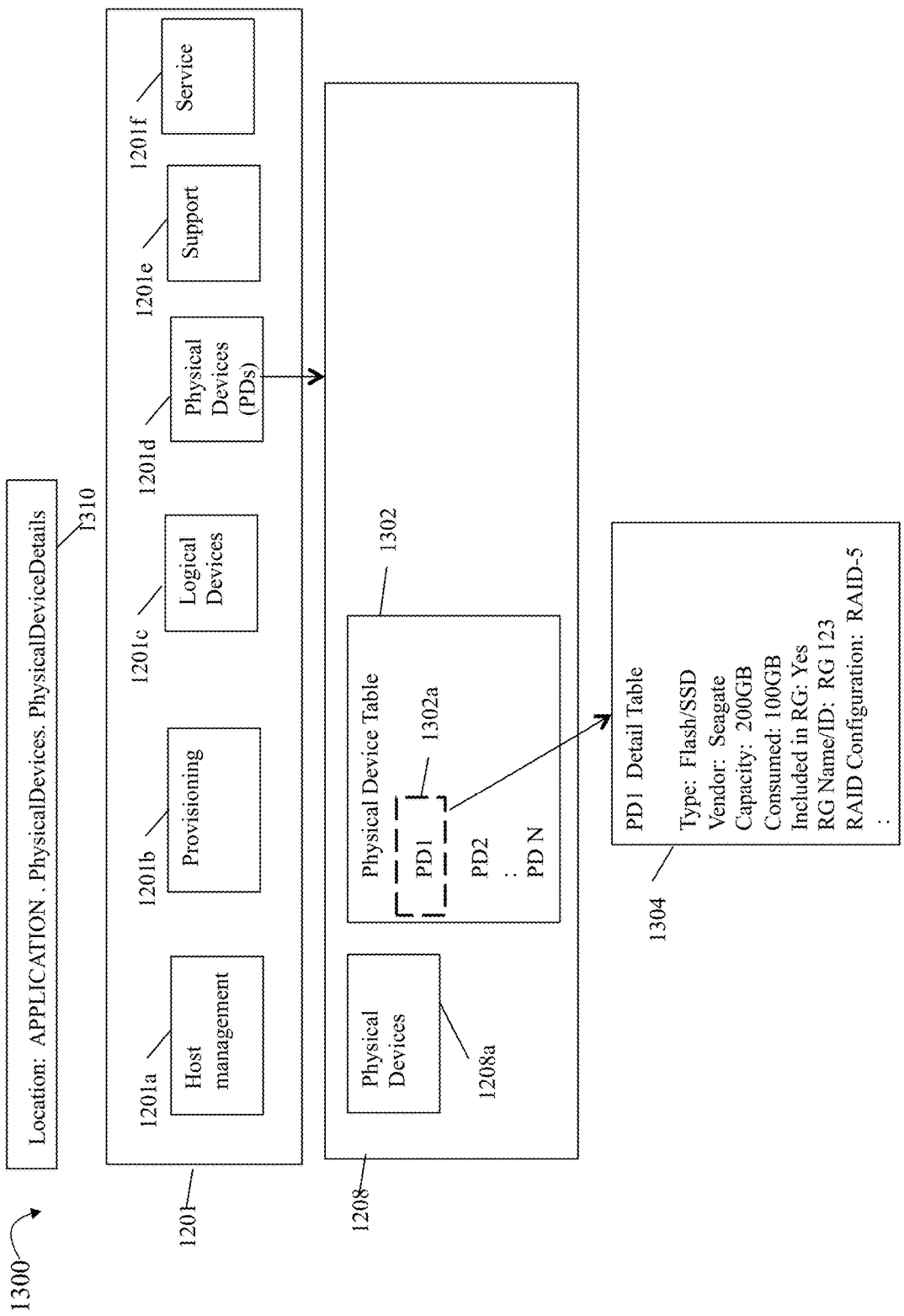

Referring to FIG. 6, shown is an example 1300 illustrating use of techniques described herein. Element 1201 may represent the content view corresponding to node 1101 of the exemplary NAV structure file of FIG. 4. The content view of 1201 may be initially displayed when the data storage management application starts. A user may select UI element 1201d to display a list of physical devices (PDs) in the form of a PD table. Element 1201 and 1201a-f of FIG. 6 may be as described above in connection with FIG. 5. Elements 1201a-f may be buttons or tabs. In response to selection of UI element 1201d, the web browser 120 may perform step S1 of FIG. 3 to notify the NAV service 130 providing context information identifying the particular UI element 1201d selected. It should be noted that the information provided in S1 to the NAV service may be the NAV ID for the UI element 1201d selected or may otherwise be information that the NAV service uses to indirectly determine the corresponding NAV ID for UI element 1201d. The NAV ID as described herein may identify a target content view to be displayed and may denote a navigational point represented by an object or node included in the structure of FIG. 4. In this example, the NAV ID may identify the node 1108 of FIG. 4 having an associated content view 1208 of FIG. 6. Element 1120a of FIG. 4 identifies the information the NAV service obtains (S2) from the NAV structure file 140 for the identified NAV ID=1108. Element 1120a may identify JS_RTN2 128 as the target code of the GUI application code 124 to which control is transferred. Element 1120a may include no metadata for alternative views meaning that there are no alternative views available or specified for NAV ID 1108 In this case, the NAV service performs S3 and transfers control to JS_RTN2 128. JS_RTN2 128 may perform processing similar to S4 as described in connection with element 126. JS_RTN2 may modify aspects of the UI needed to create the content view 1208 including table 1302 and also obtain the data from the server 110 needed to populate the table 1302. JS_RTN2 128 may include JavaScript to dynamically define a new table structure and object in the DOM for table 1302 and also dynamically set any appropriate styles or attributes. Additionally, the code of 128 may also create a text box UI element 1208a with the text "Physical Devices". The code of 128 may issue a request S5 to the server 110 to obtain a list of PD identifiers (e.g., PD1, PD2, . . . PD N) used to populate the physical device table 1302.

A user may then select a UI element displayed in 1208. In this example, the user may select an element 1302a of the PD table 1302 for PD1 as illustrated. In response to selecting 1302a, the browser 120 may notify S1 the NAV service 130 whereby the NAV service is passed information identifying the UI element 1302 as well as the particular table entry or element 1302a for PD1. In this example, assume the NAV service receives a row ID of 1 denoting the particular entry or element 1302a selected. The NAV service 130 may obtain S2 from the file 140 the information of 1120b of FIG. 4 for the NAV ID 1108a corresponding to the table 1302 (UI element selected in the current content view 1208) and also denoting the target UI content view 1304 (represented by node or navigational point 1108a). Element 1120b of FIG. 4 identifies the information the NAV service obtains (S2) from the NAV structure file 140 for the identified NAV ID=1108a. Element 1120b may identify JS_RTN1 126 as the target code of the GUI application code 124 to which control is transferred. In this example, PD1 is selected 1302a and identifies the particular PD for which details are to be displayed. The NAV service may transfer control S3A to JS_RTN1 126 providing parameters identifying the selected PD1.

JS_RTN1 126 may perform processing similar to S4 as described elsewhere herein. JS_RTN1 may modify aspects of the UI needed to create the content view 1304 including details table 1304 and also obtain the detailed information for the particular PD1 from the server 110 needed to populate the table 1304. JS_RTN1 126 may include JavaScript to dynamically define a new details table structure and object in the DOM for table 1304 and also dynamically set any appropriate styles or attributes. Additionally, the code of 126 may issue a request S5 to the server 110 to obtain detailed information for PD1 (e.g., the particular PD identified by parameters provided in S3A) used to populate the physical device details table 1304 (corresponding to content view and navigation point 1108a of FIG. 4). Thus, JS_RTN1 126 performs processing to display data in the user interface in accordance with the default view of detail table in this example.

It should be noted that the same target body of code JS_RTN1 may be invoked to provide PD detailed information for any selected PD of the table 1302 whereby the parameter(s) passed to JS_RTN1 may identify the selected PD.

In connection with the foregoing example of FIG. 6, the target body of code JS_RTN2 may implicitly know the object or other entity used to identify a physical device table based on when JS_RTN2 is expected to be invoked. In other words, as described above, JS_RTN2 may be a target body of code which only retrieves and displays the physical device table and not other tables of data. As a variation, JS_RTN2 may be a more generally or generically written target body of code that retrieves and displays other tables of data (e.g., may display a physical device table, LUN or logical device table, storage group table, RAID group table, and the like) whereby one of the parameters passed to JS_RTN2 may identify the particular table to be displayed. Similarly, the target body of code JS_RTN1 described above may be more generally written than as described above and the parameters may identify the particular selected table entry (as described above) and similarly include an additional parameter identifying the physical device table (as distinguished from other possible types of tables of information).

Element 1310 represents the UI element displaying the current navigation location within the application responsive to navigating to node 1108a in the application as represented in FIG. 4.

Figure 7:
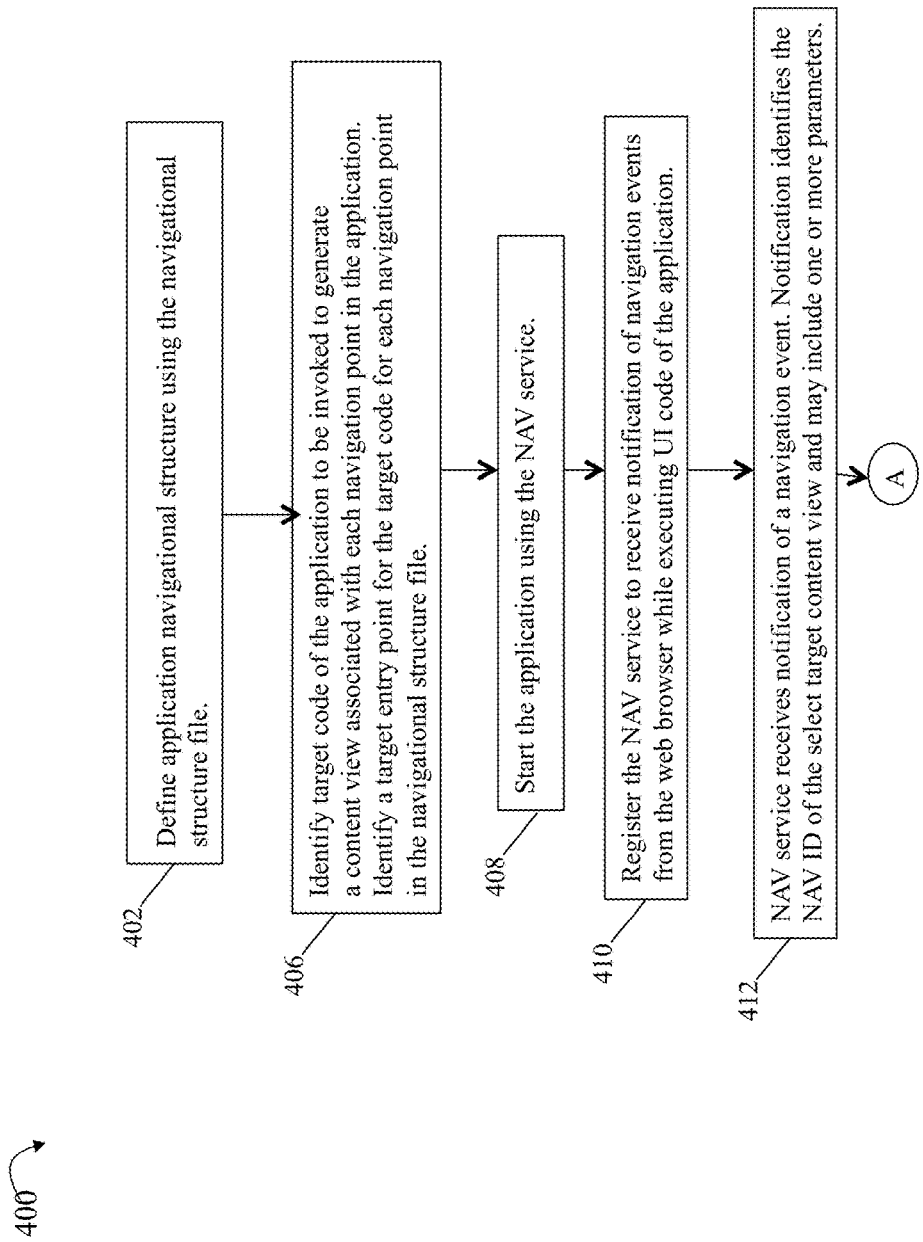
Figure 8:
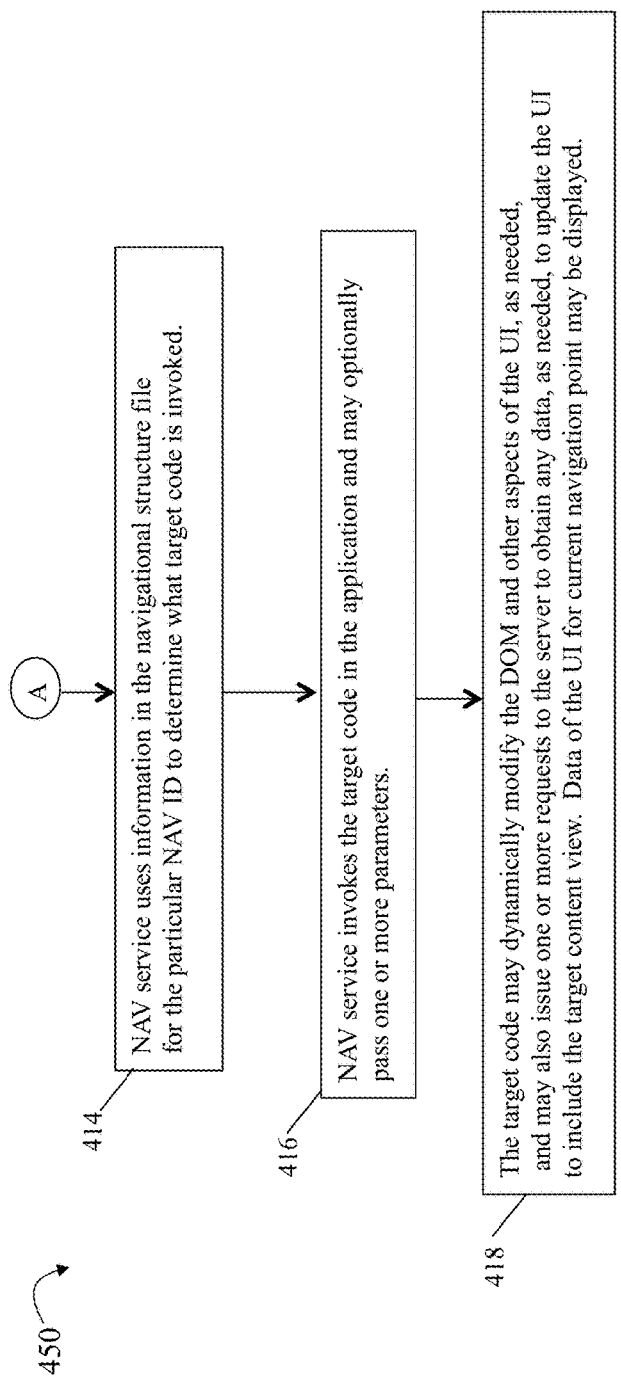

Referring to FIGS. 7 and 8, shown are flowcharts of processing steps that may be performed in an embodiment in accordance with techniques herein. The flowcharts 400, 450 summarize processing described above. At step 402, an application's navigational structure is defined and included in the navigational structure file (e.g., 140 of FIG. 3 having a structure such as illustrated in FIG. 4). At step 406, target code of the application is identified where the target code is to be invoked to generate a content view associated with a particular navigation point in the application. A target entry point of such target code is identified for each navigation point and included in the navigational structure file. At step 408, the application using the NAV service may be started. At step 410, the NAV service registers to receive notification of desired events, such as navigation events, from the web browser while executing UI code of the application. At step 412 the NAV service receives notification of a navigation event from the web browser executing the application UI code. The notification may identify a NAV ID and one or more parameters. The NAV ID may identify the target content view to be displayed and also the UI element selected which navigates to such target content view. At step 414, the NAV service uses information in the navigational structure file for the particular NAV ID to determine what target code is invoked. At step 416, the NAV service invokes the target code in the application may pass one or more parameters as input to the target code. At step 418, the target code may dynamically modify the DOM and other aspects of the UI, as needed, and may also issue one or more requests to the server to obtain any data, as needed, to update the UI to include the target content view. Data of the UI for current navigation point may be displayed. Steps 412, 414, 416 and 418 may be repeated for each navigation event about which the NAV service is notified by the web browser for the application.

What will now be described are techniques that may be used in connection with a UI, such as a GUI, where the UI presented is customized responsive to an occurrence of a trigger condition. The trigger condition that occurs may be one of a set of one or more predefined conditions such as, for example, a state or condition of a system, such as an error state of a data storage system, selection of a user-specified mode, and the like. Responsive to an occurrence of one of the trigger conditions, the GUI presented may be customized for the particular condition. In this manner, the GUI displayed may provide the user with particular feedback, UI elements such as particular menus and options, buttons, and the like, for the particular detected condition occurrence.

Typically, when a GUI of application, such as a data storage management application, is presented to a user, the GUI displayed may include an entire set of UI elements based on a general UI navigational model and design for the application (e.g., such as illustrated in FIGS. 4, 5). Based on the general navigational model, the user may always be presented with the entire set of UI elements such as, for example, tabs, an accordion bar, menus, buttons, dashboard summary listed, status bar, quick links, and the like, whereby all such UI elements may be presented to the user regardless of, or independent of, the system state or particular task the user may be performing. For many users, it may be difficult to navigate through the multiple of general UI elements and different options for the user to accomplish his/her particular task, respond to the particular event or problem occurrence, and the like.

In an embodiment in accordance with techniques herein, rather than present a generalized GUI, the GUI presented may be dynamically modified responsive to the particular trigger condition occurrence to present the user with a subset of such general information otherwise provided. The customized GUI presented may be narrower and more focused by including particular UI elements, options, and the like, which are most relevant to the trigger condition occurrence. As an example, a user may log into a system which is in an error state. In an embodiment not in accordance with techniques herein, the GUI presented may include a status bar or feedback panel denoting the current error state. However, with a very generalized GUI display that is not further customized for the particular error state, it may not be apparent to the user which particular UI elements are relevant or most useful, what UI navigations or selections to make, and the like, in connection with gathering more information about the error or in connection with attempting to correct or otherwise address the error. With display of the generalized GUI rather than a customized GUI when there is a particular error, the user may be presented with a general set of menus, tasks, and the like whereby a large amount of such displayed GUI options and controls may have nothing to do with the particular error or how to solve the particular problem or task which the user may be performing. In contrast, an embodiment in accordance with techniques herein may provide a GUI display which only displays information, actions, options, and the like with a customized set of UI elements for the particular error state or task the user desired to perform. Simplifying the GUI to adapt to various situations makes it much easier for the user. An embodiment in accordance with techniques herein may provide for customized GUI display responsive to the particular error state in a system. Additionally, an embodiment may similarly customize the GUI displayed when the system is in a non-error state (e.g., healthy, good or normal operating state) as well. For example, when the system is in a non-error state, the GUI may be customized responsive to a user-selection which causes the GUI to switch to a specialized mode to limit the amount of navigation, information displayed, and the like. For example, the user may select an option provided which places the GUI into a special mode such as a configuration mode, provisioning mode, service mode, and the like, for a particular task the user would like to perform. In this manner, the GUI displayed may be customized, for example, to limit or narrow down the UI elements and navigational options most relevant to the particular task which the user would like to accomplish.

In an embodiment, customization may include presenting a limited set of UI elements providing customized options and feedback information. Such customization may further include limiting the possible UI navigational paths and options.

In one embodiment, the customized GUI in accordance with techniques herein may replace the existing or more general GUI presented. For example, a first generalized GUI may be on display at a first point in time when the system is in a healthy state. At a second point in time, the system may transition to an error state. In response to this error state, the general GUI presented may be replaced with the customized GUI that is customized for the particular error state. In accordance with techniques herein, the GUI may be dynamically adapted or customized in response to the state of the system. For example, as described in more detail below, the GUI may be customized responsive to an occurrence of an error condition including any of a LUN threshold error condition occurring, an SP being in a degraded mode (e.g., unhealthy state), and the like.

In response to an error condition occurring that is one of the defined trigger conditions causing dynamic customization of the GUI and associated navigation workflow, the GUI presented such as when the user logs in may be an alert dialog or wizard to walk the user through various options and steps to address the particular error condition. As an alternative, the GUI presented may include a limited set of UI elements providing the user with a limited set of feedback information, selection options or user controls, navigational options and the like which have been determined as relevant to the particular error condition and steps that may be taken to gather additional information about the error condition, address or correct the error condition, and the like. Additionally as will be described in more detail elsewhere herein the GUI may be dynamically adapted responsive to a trigger condition occurrence that is a user-selected mode, such as service mode because user is service person, provisioning mode because user is storage manager or administrator, and the like.

Responsive to the occurrence of a trigger condition, processing may be performed to determine a customized GUI for the particular trigger condition that has occurred. The customized GUI may include selective UI elements and a selected UI navigational structure which are customized for the particular trigger condition that has occurred.

Figure 9:
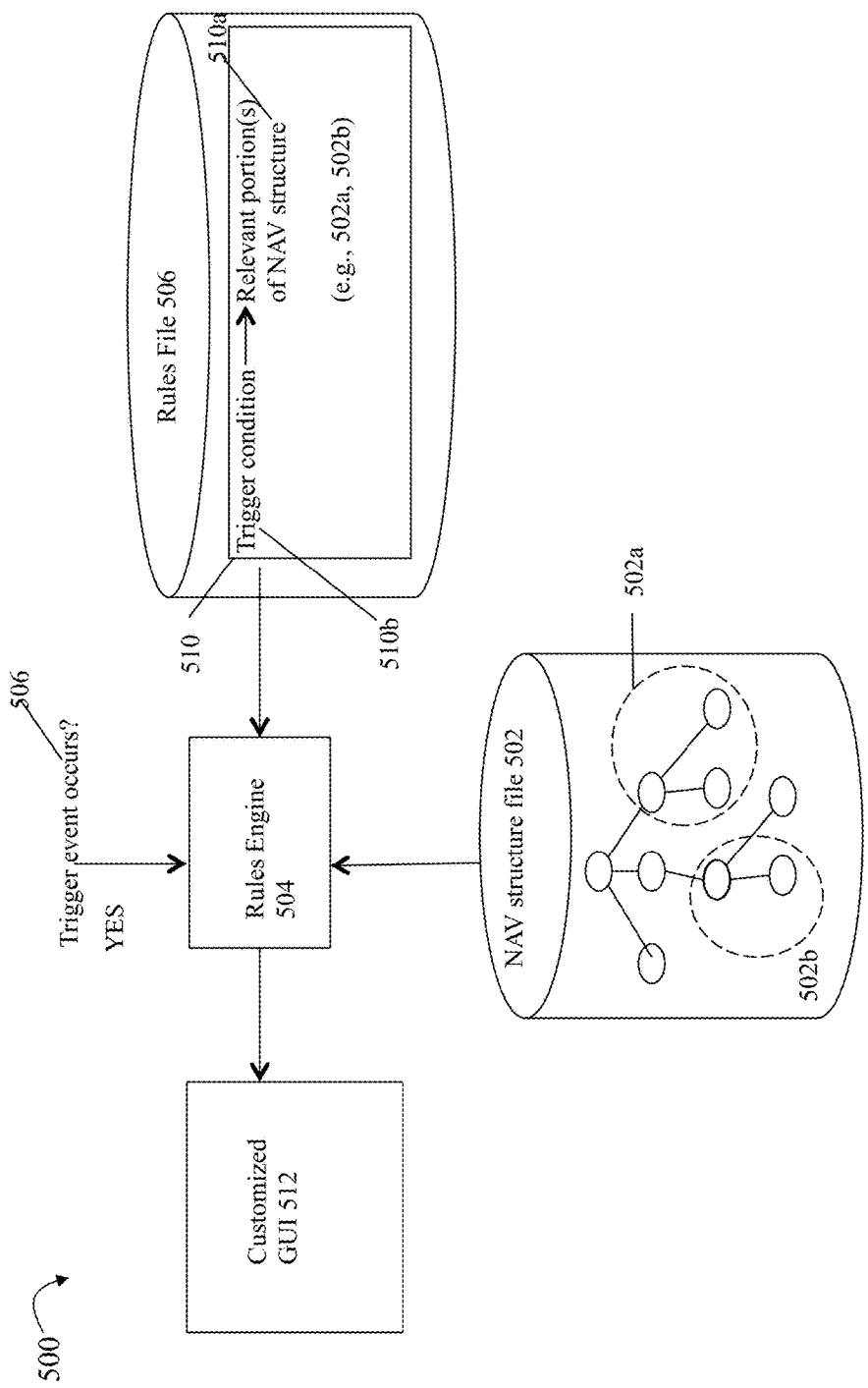
FIG. 9 is an example of components and associated processing that may be performed in an embodiment in accordance with techniques herein.

Referring to FIG. 9, shown is an example of components and associated data flow in an embodiment in accordance with techniques herein. The example 500 includes a rules engine 504, rules file 506, NAV structure file 502 and customized GUI 512. In response to a trigger condition occurring 506, control may be transferred to the rules engine 504 which performs processing. The rules engine 504 may receive as input context information identifying the particular trigger condition that has occurred such as, for example, whether the trigger condition that has occurred is an error state and if so, information regarding the particular error such as an error number or identifier. The context information may identify, for example, the particular user-selected GUI mode. The rules engine 504 may then read the rules file 506 and may traverse the rules in the rules file 506 to determine one or more rules 510 having a trigger condition that has occurred that matches the context information provided regarding the current trigger condition that has occurred. A rule 510 of the rules file 506 may include information 510b regarding one or more trigger conditions and, for each such trigger condition, may identify 510a a portion of the NAV structure customized for the particular trigger condition of the rule. Responsive to the rules engine 510 determining a match to a rule 510, the rules engine may use the information 510a to identify one or more relevant portions of the NAV structure file 502 whereby such identified relevant portions may be used to create the customized GUI 512. For example, the rule 510 (including a trigger condition 510b matching the currently occurring trigger condition) may identify in 510a a subtree or portions 502a, 502b of the application NAV structure file 502 whereby portions 502a, 502b are relevant to the trigger condition 510b of the matched rule 510. It should be noted that 510a of a matched rule may directly identify the navigational points in the application used to create the customized GUI. Alternatively, the information of 510a may be used by the rules engine to then extract relevant portions of navigation points from the NAV structure file. For example, 510a may include information identifying only the root node of a subtree within (e.g., node 1112 of FIG. 4) the NAV structure. The rules engine 504 may then have to read the file 502 to determine all relevant navigation points and nodes comprising the relevant subtree or portion. Alternatively, the information of 510a may directly identify all relevant navigation points and their structure without having to consult the file 502. The foregoing may vary with embodiment.

With reference to FIG. 9 and also with reference back to FIG. 3, the rules engine 504 may be included in the NAV service 130 and the selected portions 502a, 502b of the NAV structure file may be provided to code of the GUI application which is invoked or to which control is transferred. To further illustrate, the trigger condition occurrence may cause control to be transferred to the rules engine 504 of the NAV service 130 which may perform processing as described above in connection with FIG. 9 to determine information regarding portions of the NAV structure relevant to the current trigger condition that has occurred. The NAV service 130 may then transfer control to the GUI application code 124 and provide input parameters identifying the relevant portions of the NAV structure customized for the particular trigger condition. Code of the GUI application may then use the input parameters to display or render the customized GUI 512.

Figure 10:
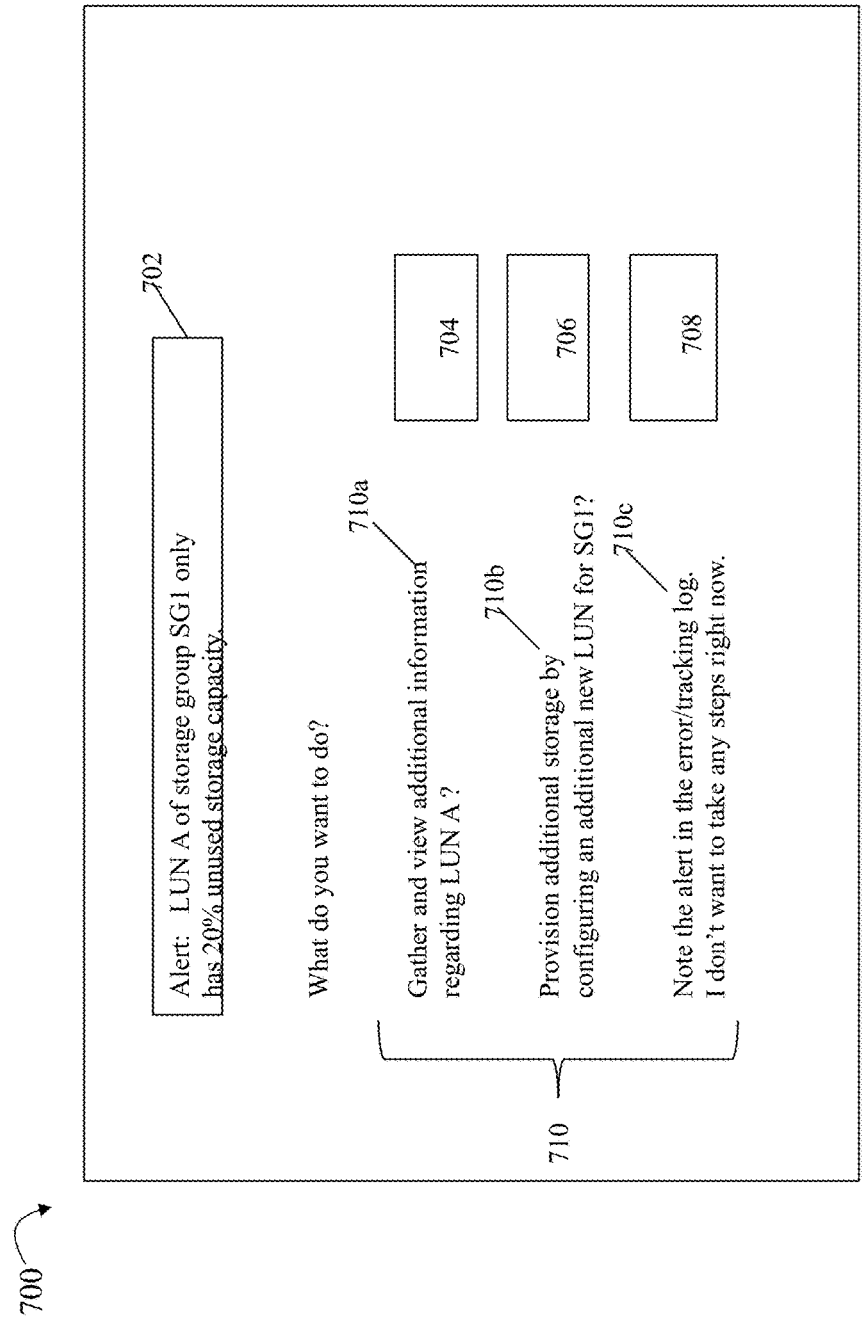
FIGS. 10, 11, 12, 13, 14, 15, 16, 17, 18, 19 and 20 are examples of user interfaces that may be displayed in an embodiment in accordance with techniques herein.

Referring to FIG. 10, shown is an example of a customized GUI that may be displayed in response to the occurrence of an error condition in an embodiment in accordance with techniques herein. The example 700 includes a GUI that may be displayed in response to the occurrence of a LUN, LUN A, having consumed a threshold amount of its storage, such as 80%, so that only 20% of its capacity remains unused or free. Such a threshold may be configurable in an embodiment. When such a threshold is reached for a particular LUN, an error state may occur. LUN A may be included in a storage group SG1 which is a defined logical grouping of one or more LUNs. A storage group of LUNs, such as SG1, may be used by an application writing its data to LUNs of SG1. If one of the LUNs of the storage group has only a minimum amount of free storage, it may signify that the application may need additional storage provisioned in SG 1 for its use.

The GUI as described elsewhere herein such as represented by 1201 of FIG. 5 may be the general GUI displayed to a user when logging in prior to the occurrence of the LUN threshold error state such as when the system is in a normal operating state. When a user logs into the system and the LUN error state is pending, a user may be presented with the customized GUI display as illustrated in the example 700 rather than a more general GUI consistent with FIGS. 4, 5 and 6 (e.g., rather than UI elements and options as in 1201). In the example 700, the GUI has been customized responsive to the particular error state of LUN A's minimum threshold of unused capacity being reached. The GUI may include a brief text description 702 of the alert generated for the particular error state. The GUI displayed may also present the user with a set 710 of possible options or actions to take and may ask the user which action of the set 710 to take. In this example, there may be 3 possible actions 710a-c each of which have an associated UI element, such as a button whereby if the UI element is selected, it indicates a user has selected the associated action. For example, a first action 710a is that a user may gather additional information regarding LUN A. If the user wants to take the first action, the user may select UI element 704. A second action 710b is that a user may provision additional storage by configuration an additional new LUN to be added to the storage group SG1 that includes LUN A. If the user wants to take the second action, the user may select UI element 706. A third action 710c is that a user may want to note the alert in the error/tracking log and may not want to take any other steps right now. If the user wants to take the third action, the user may select UI element 708.

For the above-mentioned LUN A error state as illustrated in the example 700, the rules engine 504 may identify one or more rules of 510 matching the current LUN A error state whereby such matching rules describe the actions 710. For each possible action, the matching rule(s) may identify any relevant portion of the NAV structure file 502 for the associated action that may be optionally selected by a user. With reference back to FIG. 4, the rules engine 504 may match a first rule of the rules file 506 for the LUN A error state where the first rule identifies portion 1107 of the NAV file as relevant for the first action 710a. The rules engine 504 may also match a second rule of the rules file 506 for the LUN A error state where the second rule identifies portion 1105 of the NAV file as relevant for the second action 710b. Additionally, this particular error state may not require immediate action so a third action 710c may be displayed as a third possible option. The rules engine 504 may match a third rule of the rules file 506 for the LUN A error state where the second rule may not identify any relevant portion of the NAV file and may indicate to simply display the text of 710c with the UI element 708.

Upon selection of 704, the user may be presented with detailed information regarding LUN A. The detailed information may provide additional information regarding LUN A such as, for example, identify which one or more hosts have utilized the most storage capacity of LUN A, which one or more hosts have performed the most write operations during a defined time period, and the like. Thus, the detailed information may be used to provide a user viewing such information with an insight as to which host(s) may be consuming the most storage capacity of LUN A to thereby possibly take an action with respect to that host, or the storage provisioned for use by such one or more hosts. The additional LUN information may be associated with LUN details represented by navigation point(s) or node(s) 1106a and/or 1106b of the identified relevant portion 1107 of the NAV structure file as noted above.

Upon selection of 706, the user may be presented with a GUI navigational structure including only information for navigational node or points included in 1105. For example, the root of the navigational structure may be content associated with node 1104 along with the various navigational links to 1104-c. Possible navigational paths may be consistent with those of 1105. Upon selection of 708, information regarding the error state for LUN A may be logged and the user may be presented with a new more generalized UI such as, for example, consistent with information described in connection with FIGS. 4, 5, and 6.

As a variation of the foregoing when customizing the GUI and associated navigation structure, an embodiment may leverage existing NAV structure as indicated in the NAV structure file but may reorganize identified relevant portion of nodes to have a more suitable navigational flow and/or different UI elements customized for the trigger condition occurrence. For example, upon selection of 704, rather than have the user presented with a navigational flow with UI elements as represented by 1105, the customized GUI may have a different navigational flow and different visual UI element presentation. For example, in 1105, UI elements corresponding to navigation points 1104a-c may be presented as buttons. Responsive to selecting button a UI element transitioning to point 1104b, UI elements corresponding to nodes 1104d-e may then be displayed. Rather than have a navigation structure as just described, the customized GUI may include a different navigational flow structure and also different UI elements in comparison to those of the typical general GUI. For example, the customized GUI may include a single menu with menu options providing for navigation to points 1104a, 1104c, 1104d and 1104e, may include 4 buttons for navigation points or nodes 1104a, 1104c, 1104d and 1104e, may include options for one or more of the navigation points or nodes in a wizard or interactive dialog providing sequentially ordered steps to provision storage for a new LUN, and the like.

Figure 11:
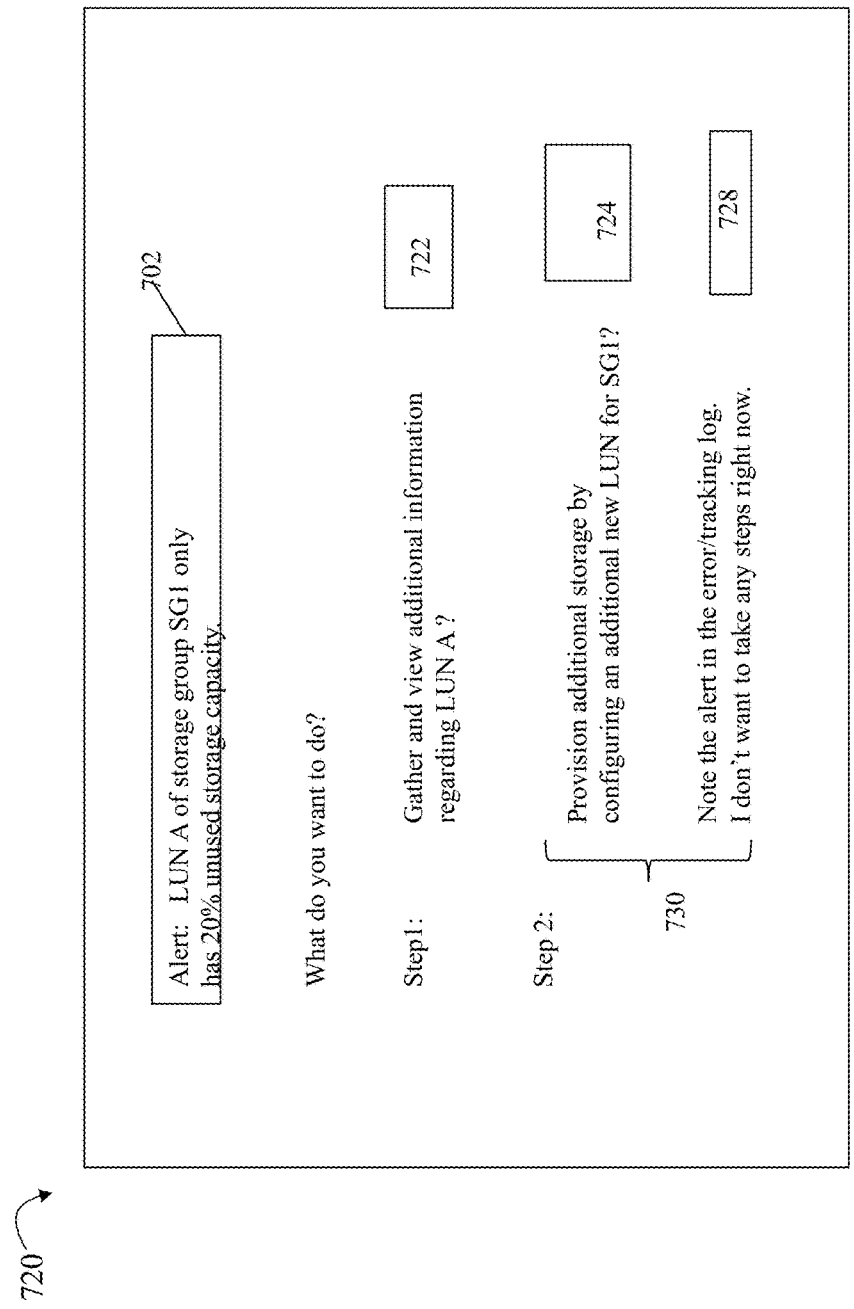

To further illustrate, reference is made to FIG. 11 where a customized GUI may be presented as a series of selectively ordered steps customized for the current error state. The customized GUI of 720 may provide a sequential ordering of the different options previously described in connection with the example 700 above. A first step may be to gather and view information regarding LUN A as currently denoted by button 722. Once the user has viewed such information, the user may be presented with 730 a set of possible step 2 options including UI elements 724 and 728. UI elements 724 and 728 correspond, respectively, to discussion above regarding UI elements and associated actions for 706 and 708. Thus, the example 720 illustrates the same options as the example 720 with the difference that options may be further grouped and associated with a step of a sequential logical ordering in which such steps may be performed.

Figure 12:
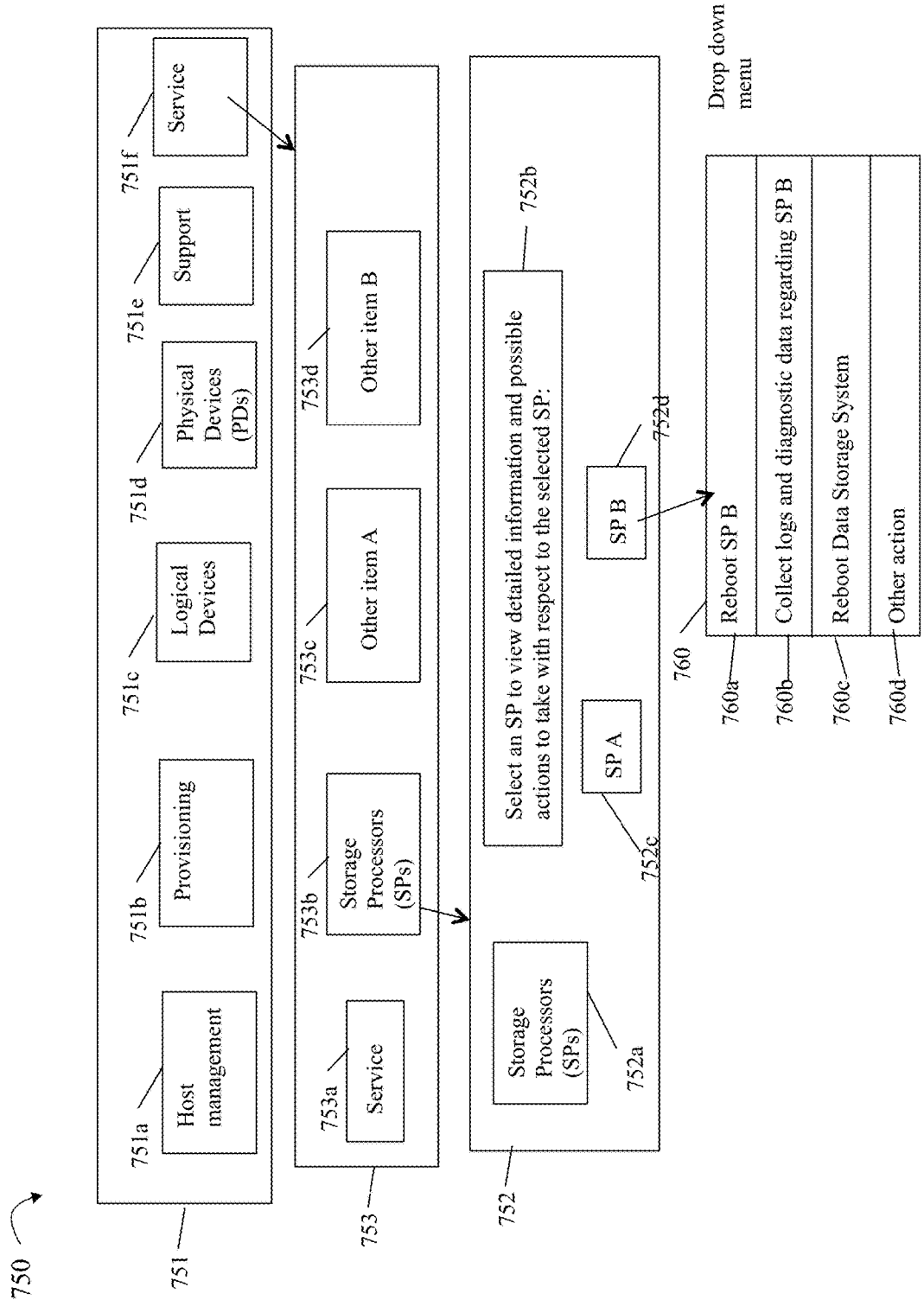

Referring to FIG. 12, shown is an example 750 of various UI elements and content views that may be displayed for a general uncustomized GUI when the system is in a normal operating mode such as with no error state pending. Element 751 may represent the content view corresponding to node 1101 of the exemplary NAV structure file of FIG. 4. It should be noted that details regarding transfer of control between components such as illustrated in FIG. 3 are omitted for simplicity but such processing and transfer of control may be performed consistent with discussion elsewhere herein when navigating to different points in the application structure as well as in response to trigger condition occurrences.

The content view of 751 may be initially displayed when the data storage management application starts when the system is in a normal operating state. A user may select UI element 751f to display further information and options in connection with servicing aspects of the data storage system. Element 751 and 751a-f may be as described above in connection with FIG. 5. Elements 751a-f may be buttons or tabs. In response to selection of UI element 751fd, the content view 753 may be displayed for options in connection with servicing the data storage system. The content view 753 may include displayed text of 753a and buttons or other selectable UI elements 753b-d. A user may then select UI element 753b. In response to selecting 753b, content view 752 may be displayed which includes text of 752a-b and buttons or other selectable UI elements 752c-d. A user may then select U element 752d to perform an operation with respect to SP B. In response to selecting 752d, the user may be presented with UI element 760 which may be a drop down menu of possible options or actions that may be taken. The menu 760 may include option 760a to reboot SP B, 760b to collect logs and other diagnostic data regarding SP B, 760c to reboot the data storage system, and 760d to perform some other action.

The example 750 may include the information and associated content views displayed in response to the above-mentioned navigation through the application GUI having a navigational structure as described in connection with FIG. 4. In particular, content view 751 may correspond to node or navigation point 1101, content view 753 may correspond to node or navigation point 1112, content view 752 may correspond to node or navigation point 1112a, and content view including 760 may correspond to node or navigation point 1112e.

In this example, assume now that SP B becomes unhealthy and transitions to a degraded mode or state. In an embodiment in accordance with techniques herein, a customized GUI may be displayed to a user having a customized navigational flow for the particular error state of SP B being degraded. At this point, assume that a user logs into the system with the pending error state of SP B being in a degraded state as just described. SP B may be in such a degraded state for any one or more reasons. A user logging into the system presented with an uncustomized GUI and navigational flow options as in the example 750 may have difficulty navigating around to try and determine the steps to take to analyze and address the degraded SP B state. However, in an embodiment in accordance with techniques herein, the user may be presented with a customized GUI presenting a set of relevant and reduced information, navigational options, and the like to facilitate the user in addressing the pending degraded SP B state.

What will now be described are examples of possible customized GUIs that may be used in such an embodiment in accordance with techniques herein with the pending degraded SP B state.

Figure 13:
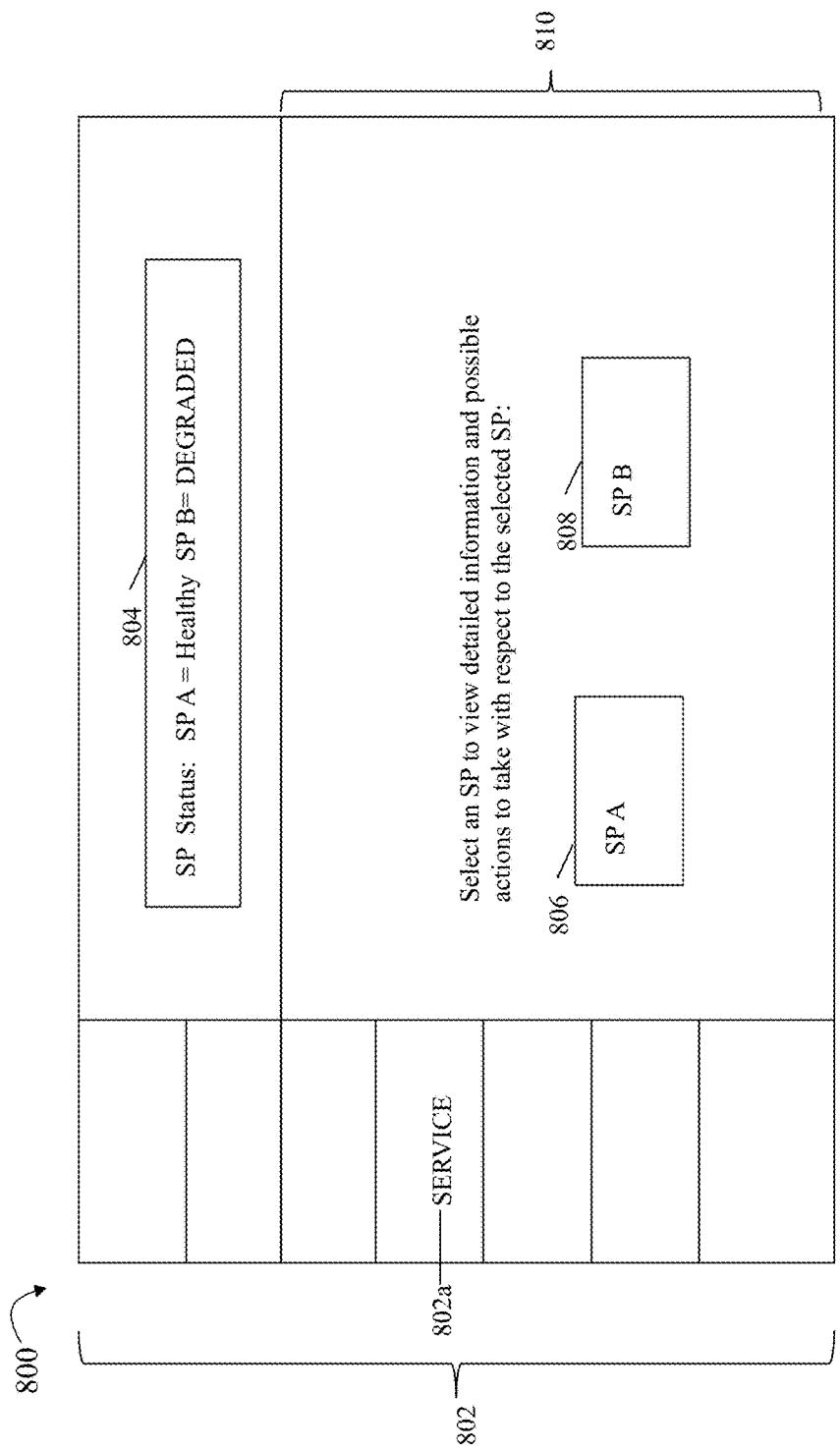
Figure 14:
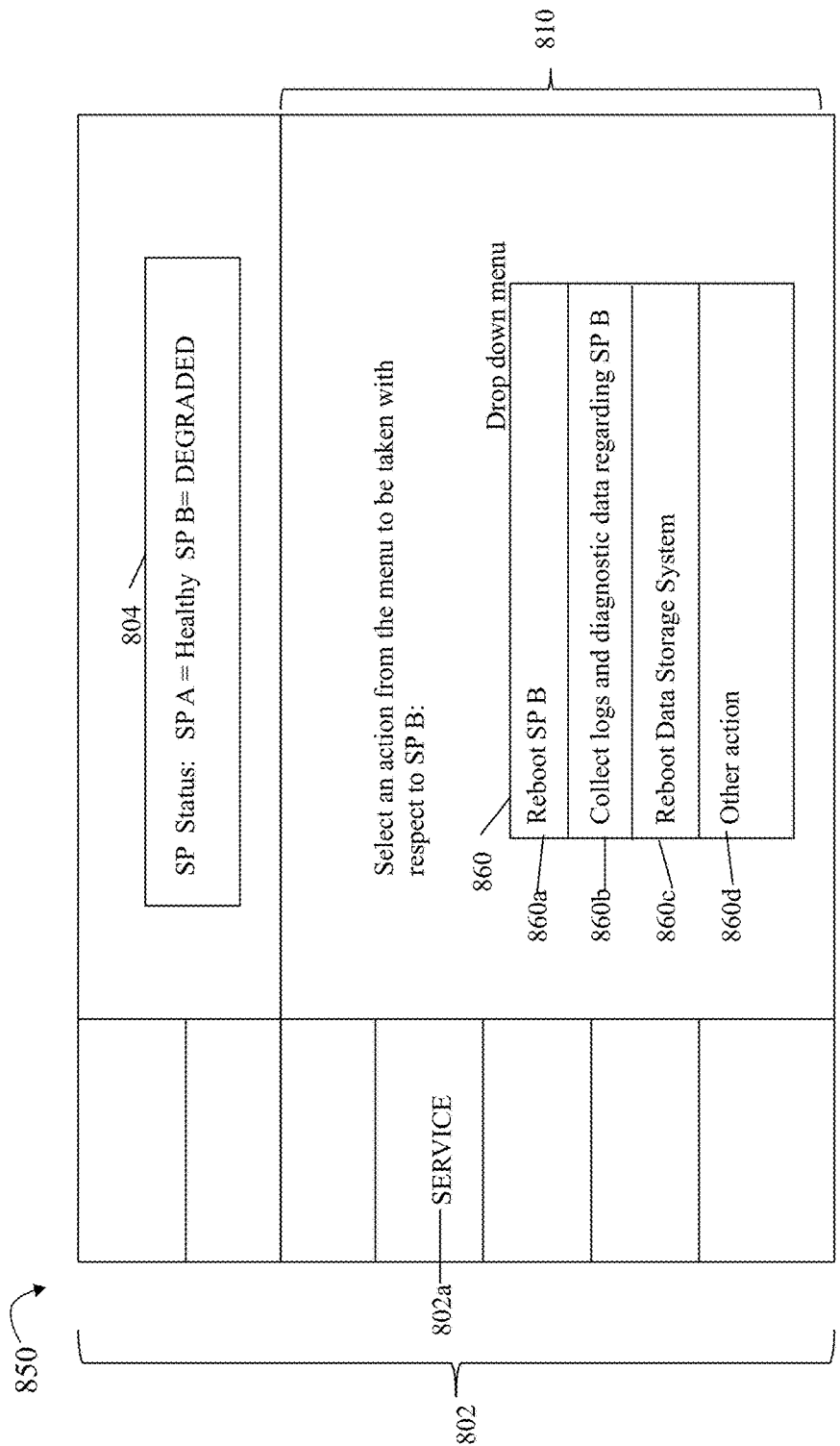

Referring to FIGS. 13-14, shown are a series of customized GUIs that may be presented to the user with a pending degraded SP B error state in connection with a first approach to customizing a GUI for current error state. FIG. 13 includes a first GUI that may be initially displayed, such as when the user logs in, and FIG. 14 includes a second GUI displayed in response to a user making a selection from the customized GUI of FIG. 13 as described below. It should be noted that in connection with this first approach for the customized GUI, the portion 1109 of the NAV structure of FIG. 4 may be identified as relevant to the pending error state of SP B being degraded. Consistent with description elsewhere herein, the rules engine may perform processing responsive to the occurrence of the error state whereby such processing determines a matching rule in the rules file. The matching rule may identify portion 1109 of the NAV structure as relevant to the pending error state. In this first approach, the customized GUIs may preserve the navigational structure represented by relevant portion 1109.

Referring to FIG. 13, shown is an example of a customized GUI that may be presented to the user such as when logging in to the system with the pending error state of a degraded SP B in an embodiment in accordance with techniques herein. The example 800 includes an accordion tab panel 802 which may include a tab for each node at level 1 (e.g., nodes 1102, 1104, 1106, 1108, 1110, 1112) of the NAV structure such as in FIG. 4. In the example 800 however, the only active or enabled tab is 802a for the service options corresponding to node or navigation point 1112 of FIG. 4. Area 810 may correspond to the content view associated with node 1112a. Area 810 may include information consistent with that as described above in connection with 752 of FIG. 12. Thus, the example 800 includes information similar to that as would be displayed if the user selected UI elements and navigated through navigation points for 1112 and 1112a of FIG. 4. Element 804 may be an informational status panel with a description of the pending SPs indicating that SP A is healthy and SP B is currently in a degraded mode or state.

Elements 806 and 808 denote selectable UI elements, such as buttons At this point, a user may select one of the SPs by selecting an SPs corresponding UI element. IN this example, since SP B is the degraded SP, a user may select UI element 808. In response to selecting 808, the display may be updated to include the GUI as in the example 850 of FIG. 14.

With reference now to FIG. 14, the area 810 has been updated to include additional information in response to the user selecting UI element 808 to navigate from navigation point 1112a (as in FIG. 4) to navigational point 1112e (as in FIG. 4). In this example 850, the area 810 now includes the additional information 860 associated with navigation point 1112e. Element 860 includes information and UI elements similar to element 760 of FIG. 12.

Figure 15:
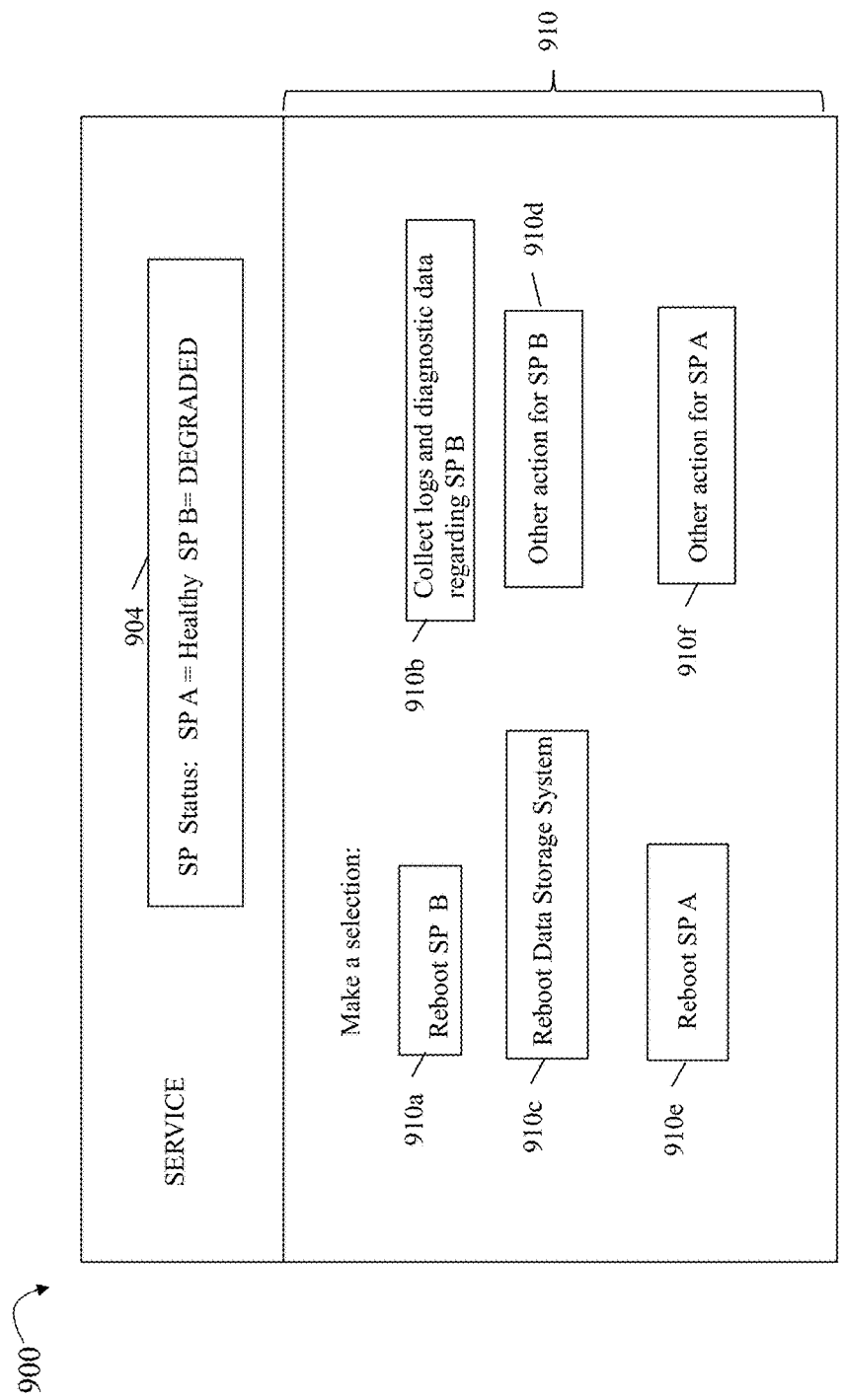

Referring to FIG. 15, shown is an example of a customized GUI that may be presented to the user with a pending degraded SP B error state in connection with a second approach to customizing a GUI for current error state. In connection with the first approach using customized GUIs in an embodiment in accordance with techniques herein, the customized GUIs preserved the NAV structure and flow of the relevant identified portion 1109. In connection with this second alternative approach, what will now be illustrated is a customized GUI in which the relevant portion 1109 of the NAV structure is not preserved The same relevant portion 1109 may be identified which may then be further modified to produce the customized GUI of FIG. 15.

In the example 900 of FIG. 15, the customized GUI may be displayed in response to the pending SP B degraded error state in an embodiment in accordance with techniques herein. The example 900 may be displayed, for example, when the user logs in to the application. The customized GUI may include status information 904 identifying the status of SP A (healthy) and SP B (degraded or unhealthy). The area 910 may be customized to include buttons with possible relevant actions for the user to take in connection with the current error state. It should be noted that in this example, the area 910 includes UI elements 910a-d including options as described in connection with 760 of FIG. 12. Additionally, the area 910 may include buttons 910e-f with other possible actions. In this example, the actions corresponding to buttons 910e-f may be associated with the content view for navigation point 1112d of FIG. 4. The actions corresponding to buttons 910a-d may be associated with the content view for navigation point 1112e of FIG. 4. Responsive to displaying the GUI of the example 900, the user may select one of the buttons 910a-f to perform an action determined.

Thus, in this example 900 for the second approach, the customized GUI may not preserve the navigational flow of the original NAV file portion 1109 and may also visually alter the UI elements for performing the particular actions. For example, as illustrated in FIG. 12 for the uncustomized GUI, the user made several navigational UI selections to result in displaying the drop down menu 760. In this example 900 with the customized GUI, the user is initially presented with the GUI and buttons 910a-f without having to perform any navigational UI selections. Additionally, in the example 900 for the customized GUI, buttons 910a-d may be displayed rather than the drop down menu with menu options 760a-d as in the uncustomized GUI of FIG. 12.

It should be noted that the buttons of 910 may have ordering or positioning determined in accordance with a likelihood (such as based on historical data) that the particular associated action has been known to correct the current error state. For example, for a degraded SP, it may be that a most common corrective action is indicated by button 910a which is positioned first in the left most corner of all buttons displayed in 910 corresponding to possible selectable actions. An embodiment may display such actions in an order different from those of the menu 760.

Figure 16:
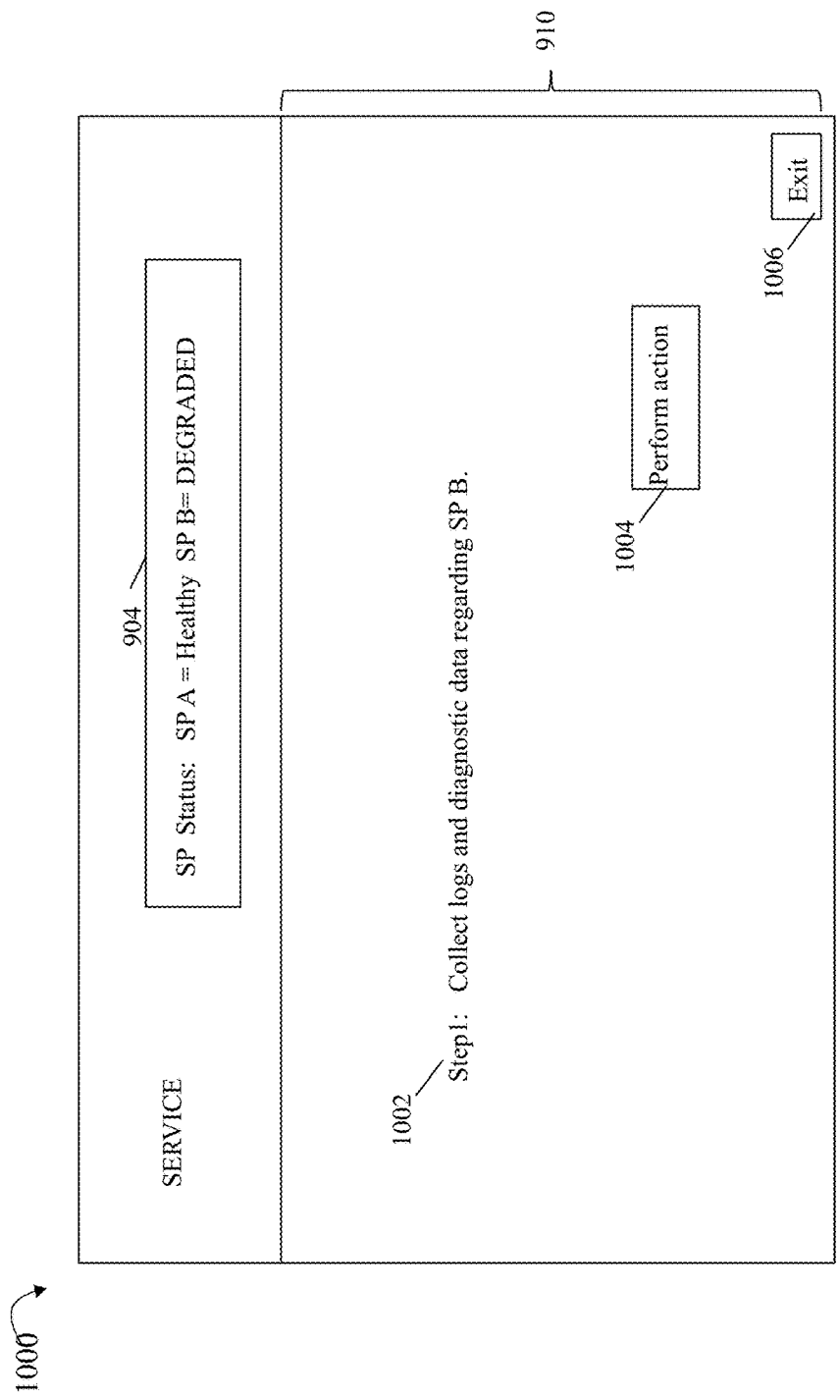
Figure 17:
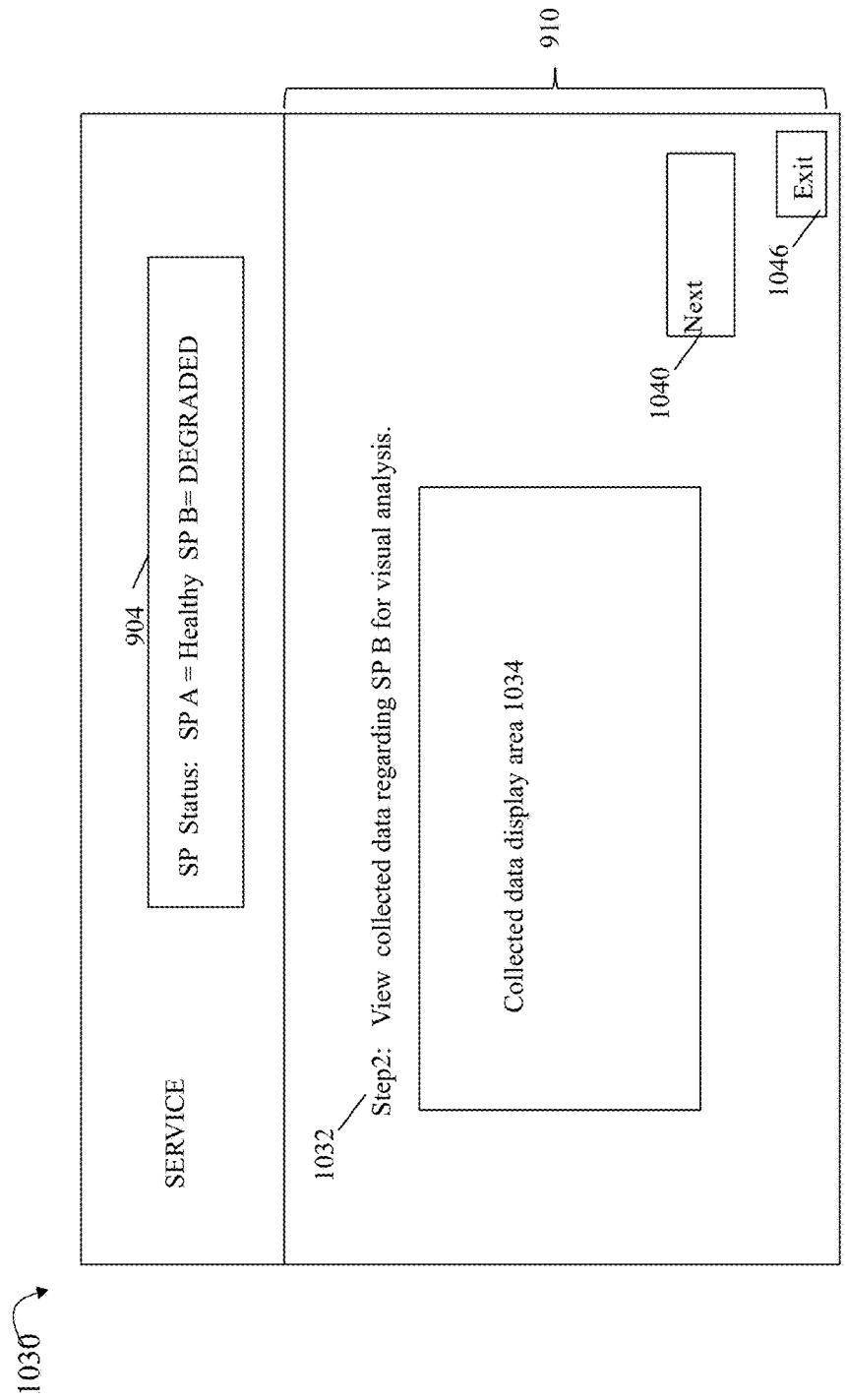
Figure 18:
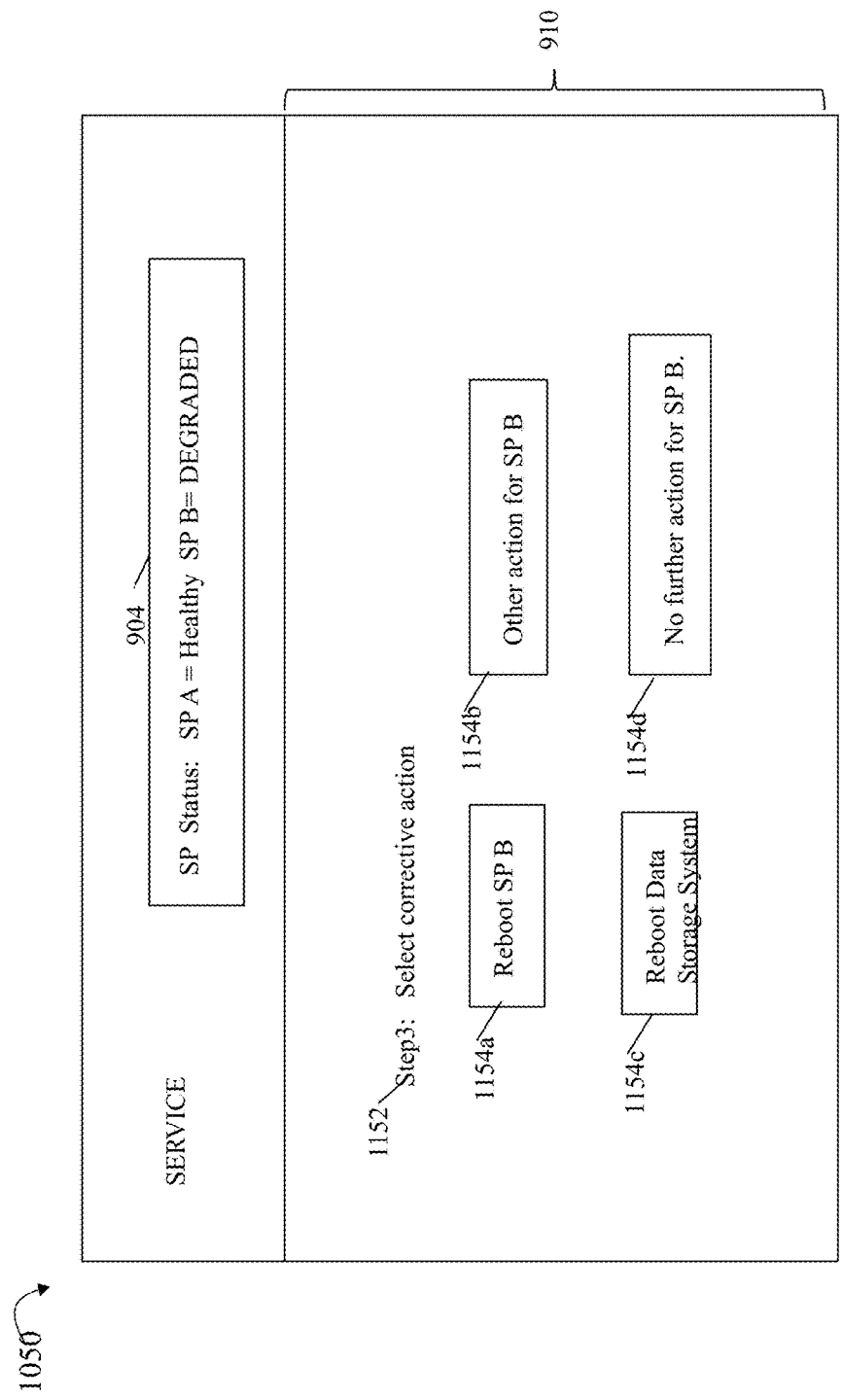

Referring to FIGS. 16-18, shown are examples of customized GUIs that may be presented to the user with a pending degraded SP B error state in connection with a third approach to customizing a GUI for the current error state. In connection with the third approach, a user may be presented with GUIs providing a guided sequence of steps performed in connection with the pending degraded SP B error state. With this third approach, the customized GUIs may present steps based on the identified relevant portion 1109 of the NAV structure of FIG. 4 consistent with the above-mentioned first and second approaches. However, in this third approach, some of the actions or functionality associated with the different navigation points in 1109 may be selectively ordered to outline a logical sequence of actions that a user may take to address the current error state.

Referring to FIG. 16, shown is a first customized GUI that may be displayed in connection with the third approach in an embodiment in accordance with techniques herein. In the example 1000, shown is a customized GUI with a first step of a wizard or dialogue provided a guided sequence of steps that may be performed based on the relevant portion 1109 of the NAV structure file for the SP B degraded error state. The area 910 of the GUI includes a description 1002 of a first step that may be taken by a user in connection with analyzing the current error state of SP B. To perform the action of the first step to collect logs and diagnostic data regarding SP B, the user may select button 1004. Alternatively, the user may select 1006 to exit out of the current navigational flow customized for the current error state. If the user selects 1006, the user may be presented with a more general GUI, non-customized such as described elsewhere herein.

In response to selecting 1004, the GUI of FIG. 16 may be displayed in connection with a second step of the customized sequence of steps for the current error state. In the example 1030, responsive to selecting 1004, the area 910 has been updated to now include step 2 description 1132 to view the collected data regarding SP B for visual analysis. The data may be viewed in area 1034. Although not illustrated, the customized GUI may in the area 910 of the example 1030 may also include different options for viewing the collected data regarding SP B such as graphically viewing selecting portions of the data, searching and organizing the data, and the like, to facilitate the user's analysis. To proceed to the next step, the user may select button 1040. To exit the current customized navigational flow, the user may select button 1046.

In response to selecting 1040 of FIG. 17, the GUI of FIG. 18 may be displayed in connection with a third step of the customized sequence of steps for the current error state. In the example 1050 of FIG. 18, responsive to selecting 1040, the area 910 has been updated to now include step 3 description 1152 and buttons 1154a-d with possible actions that may be selected. In connection with this third approach as illustrated with FIGS. 16-18, the identified relevant portion 1109 of the NAV structure may be identified by a rule of the rules file as described above. However, the navigational workflow may be modified to provide a sequence of steps in which various actions associated with multiple navigational points may be ordered and included in the foregoing sequence of customized GUIs.

With reference back to FIG. 17, additionally, or alternatively, an embodiment may provide other options and user selectable controls (not illustrated) providing for automated analysis of the collected data that may be provided in an embodiment. Such automated analysis may provide for subsequent recommended actions presented in a next GUI in step 3 whereby the recommended actions may be determined based on the results of the automated analysis.

As described herein, an embodiment may define trigger conditions causing customization of the GUIs and navigational flow whereby the trigger conditions may include one or more user-specified modes. For example, an embodiment may provide one or more different ways in which a user manually set or configure a mode for the particular user. Subsequently, GUIs displayed for that user as well as navigational flow allowed for that particular user may be customized in accordance with the selected mode.

Figure 19:
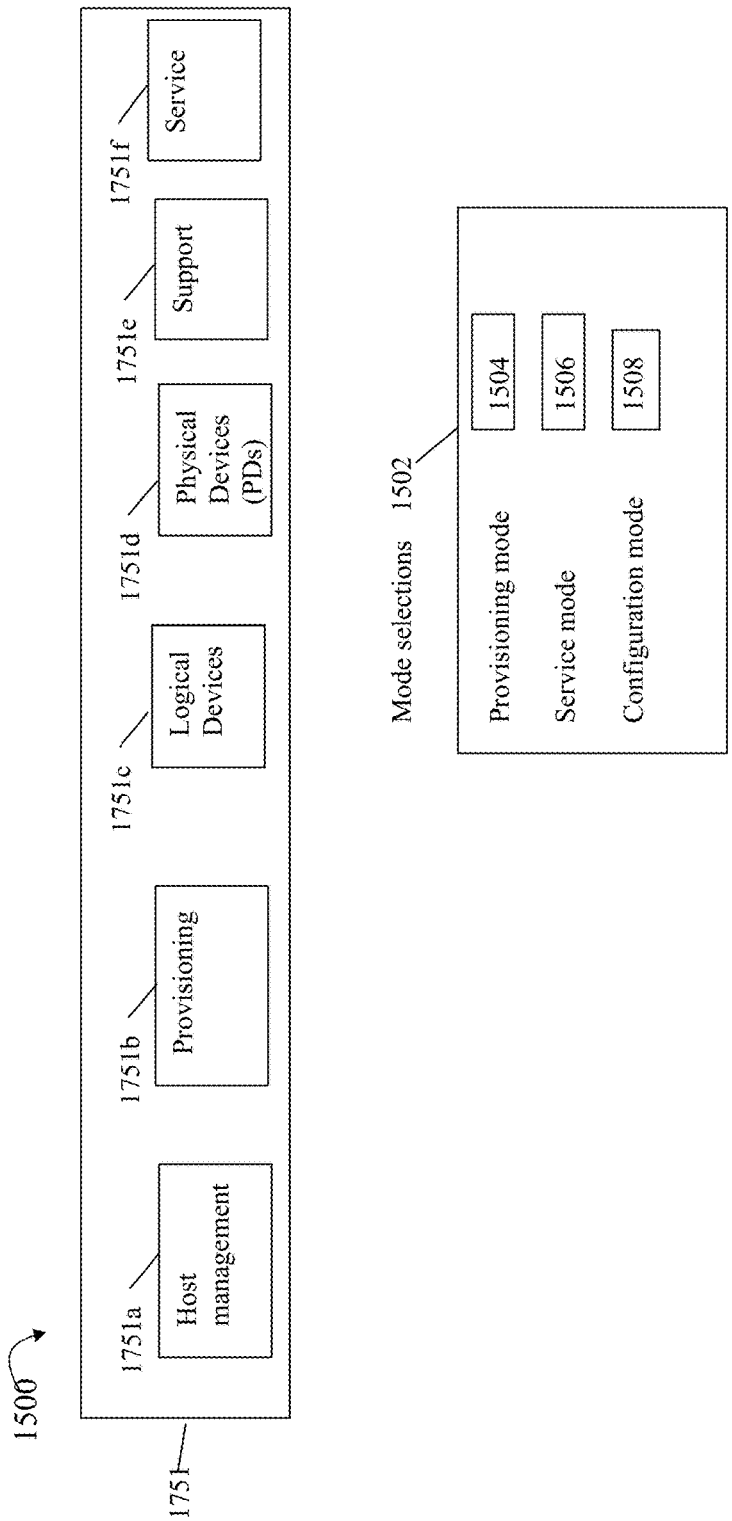

With reference to FIG. 19, shown is an example of a GUI that may be displayed in connection with selection of a mode in an embodiment in accordance with techniques herein. The example 1500 may be an initial GUI displayed in a normal or typical system operating mode when not providing a customized UI and navigation flow. The element 1751 may represent a content view displayed when a user initially logs into a system with no particular mode selected. The element 1751 is consistent with the navigational structure and content view for node 1101 of FIG. 4. In one embodiment, a GUI may include 1502 identifying the mode selections from which a user may select. Element 1502 may be a menu with menu options 1504, 1506 and 1508, or a panel of buttons 1504, 1506, 1508, or any other suitable selectable UI element that a user may user to select an available mode. In one embodiment, modes may include a provisioning mode 1504, a service mode 1506 and a configuration mode 1508. The particular mode selected may be saved as a user specific option that may vary with each user of the GUI application. The provisioning mode may provide for customized GUIs and navigation flow for the specific task of provisioning. For example, with reference to FIG. 4, responsive to a user selecting 1504, element 1105 may denote the relevant portion of the NAV structure for the particular user. After selecting 1504 and subsequently logging into the application, the GUI presented may be customized for the provisioning mode. Generally, service mode may be selected by a user who services the data storage system being managed by the application. Such a user may typically perform operations and tasks associated with node 1112 of FIG. 4 and other navigational points in the subtree having node 1112 as the subtree root. Configuration mode may be selected by a user who does various configuration tasks such as, for example, may configure PDs into pools or RAID groups, may configure cache and other data storage system resources, and the like. Such a user who does configuration mode tasks may typically perform operations, for example, associated with node 1108 of FIG. 4 and other nodes of FIG. 4 in the subtree having node 1108 as its root. Configuration mode tasks may also be associated with other navigation points not included in the particular example illustration of FIG. 4.

Figure 20:
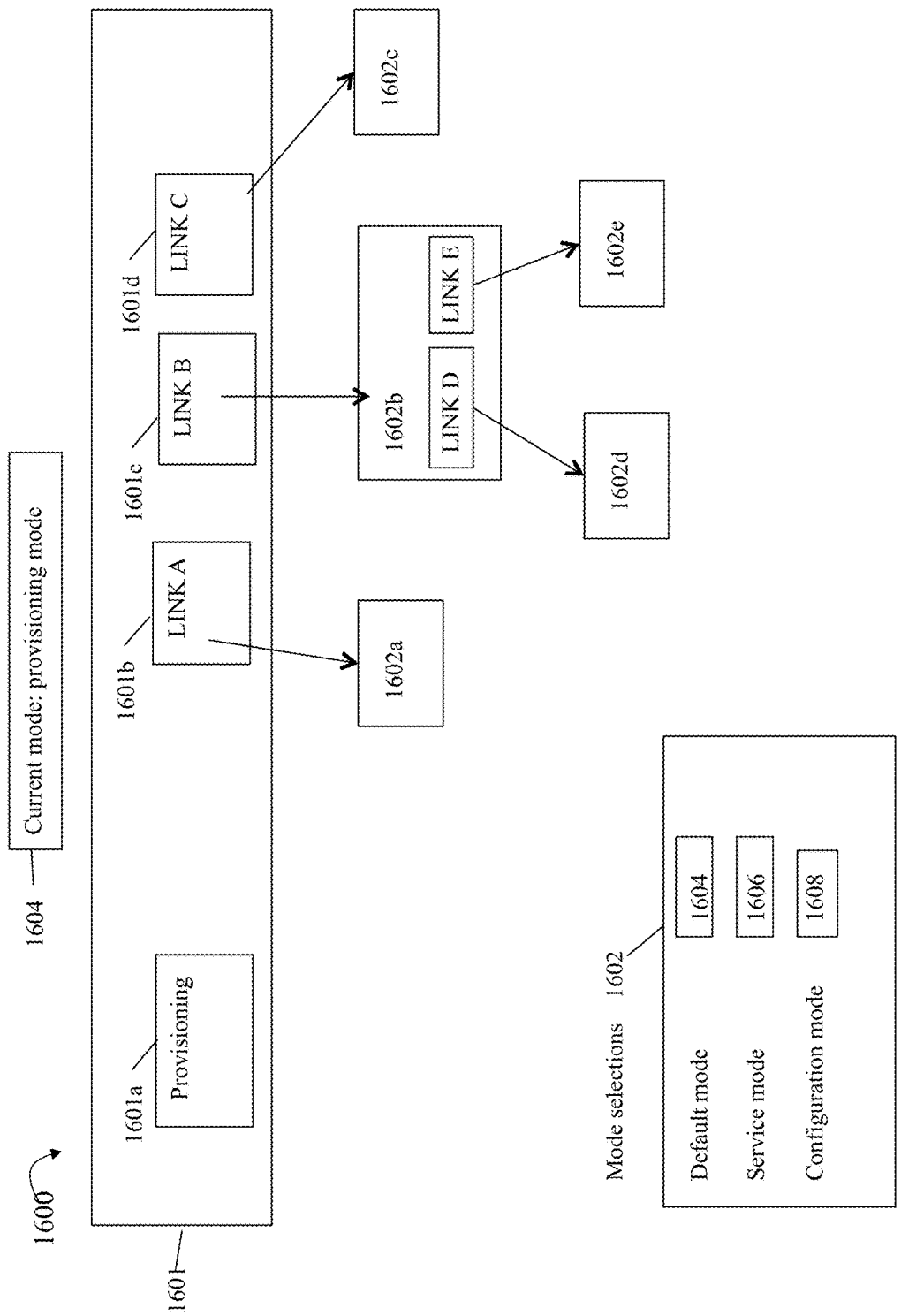

In one embodiment, after the user has selected the provisioning mode, the user may be presented with the customized GUI of FIG. 20 the next time the user logs into the application. The example 1600 includes a UI customized in accordance with the relevant portion 1105 of the NAV structure file for the application. In this example, the NAV structure of the portion 1105 may be preserved in the customized GUI and navigation flow for provisioning mode. However, generally, as described above in connection with error conditions representing different system states, the customized GUI and navigation flow does not have to match that of the identified relevant portion 1105 of the NAV structure. More generally, the identified portion 1105 may be used in connection with determining the customized GUI and navigation flow for the selected mode. The user may be restricted or limited in terms of possible navigation options and transitions based on the customized workflow of the relevant sub portion 1105. For example, the user may not be able to navigate to or perform operations in connection with other navigation points of the NAV structure of FIG. 4 other than 1105.

Element 1601 may represent the content view associated with node or navigation point 1104 of FIG. 4. Elements 1601*b-d* may represent UI elements providing navigation links to, respectively, navigation points or nodes 1104*a-c* of FIG. 4. Selection of LINK A 1601*b* may result in navigating to navigation point 1104*a* of FIG. 4 and displaying content view 1602*a* associated with the navigation point 1104*a*. Selection of LINK B 1601*c* may result in navigating to navigation point 1104*b* of FIG. 4 and displaying content view 1602*b*. Selection of LINK C 1601*d* may result in navigating to navigation point 1104*c* of FIG. 4 and displaying content view 1602*c*. Selection of LINK D may result in navigating to navigation point 1104*d* of FIG. 4 and displaying content view 1602*d*. Selection of LINK E may result in navigating to navigation point 1104*e* of FIG. 4 and displaying content view 1602*e*.

Selection of service mode 1606 may result in similar customization of the GUI and associated workflow for the selected service mode. For example, the relevant portions of the NAV structure determined as relevant in accordance with a matching rule may be the subportion or subtree including nodes 1112, 1112*a*, 1112*b*, 1112*c*, 1112*d* and 1112*e*. In one embodiment, the customized GUI and workflow for the user the next time the user logs in to the application may be based on the foregoing relevant portion of the NAV structure. One option may be to have a GUI with an initial display using the content view for node or navigation point 1112 as the root for customized GUI and associated navigational flow. The user may be restricted or limited in terms of possible navigation options and transitions based on the customized workflow of the relevant sub portion. For example, the user may not be able to navigate to or perform operations in connection with other navigation points of the NAV structure of FIG. 4 beyond those of the identified relevant subportion.

Selection of configuration mode 1608 may result in similar customization of the GUI and associated workflow for the selected configuration mode. For example, the relevant portions of the NAV structure determined as relevant in accordance with a matching rule may be the subportion or subtree including nodes 1108 and 1108*a*. In one embodiment, the customized GUI and workflow for the user the next time the user logs in to the application may be based on the foregoing relevant portion of the NAV structure. One option may be to have a GUI with an initial display using the content view for node or navigation point 1108 as the root for customized GUI and associated navigational flow. The user may be restricted or limited in terms of possible navigation options and transitions based on the customized workflow of the relevant sub portion. For example, the user may not be able to navigate to or perform operations in connection with other navigation points of the NAV structure of FIG. 4 beyond those of the identified relevant subportion.

As a further option, an embodiment may also provide for associating a role for a user. The role may be one or more of a selected set of roles defined in a system. In one embodiment a role may be defined for each of the possible mode selections available. A user may be accordingly assigned a role which may automate selection of a mode corresponding to the user's assigned role.

Referring to FIG. 21, shown is a flowchart of processing steps that may be performed in an embodiment in accordance with techniques herein. The steps of 1400 summarize processing described above. In step 1402, one or more trigger conditions may be defined. Such trigger conditions may include, for example, one or more error conditions or states regarding the system which are not considered normal or typical operating mode states. Such states may denote an error or problem of the system which, if it occurs during system operation, need attention and possible corrective action. The trigger conditions may also include any one or more user-specified modes. The particular mode may be set manually, such as by a user selection, or may be automatically determined, such as based on a role assigned to a user whereby particular tasks may also be performed by users assigned the role. Thus, the trigger conditions may include real-time error conditions that occur during system operation and/or may include a particular mode or setting based on a user-selection of the mode as well as an automated determined of the mode, such as based on roles assigned to users. Step 1402 may also include defining one or more rules which, for each trigger condition, may identify a relevant portion of the application's navigational structure. At step 1404, a determination is made as to whether a trigger condition has occurred. Control may remain at step 1404 until one of the trigger conditions has occurred. Once step 1404 evaluates to yes, control proceeds to step 1406 where the rules engine may be executed to determine one or more rules each having a trigger condition that matches the trigger condition that has occurred in step 1404. In step 1408, the relevant portions of the application NAV structure may be identified in the matching rules directly. As also described herein, depending on how the relevant portions of the NAV structure are denoted in the matching rule(s), step 1408 may also include identifying the relevant portions of the NAV structure by consulting the NAV structure file. In step 1410, the customized GUI(s) and associated customized navigational flow are prepared in accordance with the identified one or more relevant portions of the application NAV structure.

Although exemplary uses herein may be made with reference to particular UI elements, it will be appreciated that techniques herein may be used in connection with any suitable UI element of an interface. UI elements may include, for example, a menu, a menu bar, a menu item, a text box, a button (e.g., radio button, cycle button), a wizard, a navigation section including one or more hyperlinks, a table, a drop-down list, a list box, a check box, a dialog box, and a combo box. Menus allow the user to execute commands by selecting from a list of choices. Menu options are selected, for example, with a mouse or other pointing device within a GUI. A keyboard may also be used. A menu may be, for example, a pull-down menu displayed in response to a user selection. A menu bar may be displayed horizontally across the top of the screen and/or along the tops of some or all windows. A software wizard is a UI type that presents a user with a sequence of dialog boxes that lead the user through a series of well-defined steps. A text box may be a box in which to enter text or numbers. A hyperlink may be displayed as text with some visual indicator (such as underlining and/or color) indicating that selecting the link will result in linking or displaying another screen or page. Properties of a hyperlink may relate to whether the hyperlink is enabled, disabled or hidden. If enabled, the particular path or location identifying a website or the web page may be displayed in response to selection of the hyperlink. A drop-down list may be a list of items from which to select. The list normally only displays items when a special button or indicator is selected. A list box allows a user to select one or more items from a list contained within a static, multiple line text box. A combo-box may be a combination of a drop-down list or list box and a single-line textbox, allowing the user to either type a value directly into the control or choose from the list of existing options. A check box indicates an "on" or "off" state via a check mark ☑ or a cross ☒. . A radio butting is similar to a check-box, except that only one item in a group can be selected. Its name comes from the mechanical push-button group on a car radio receiver. Selecting a new item from the group's buttons also deselects the previously selected button. A cycle button is a type of button that cycles its content through two or more values, thus enabling selection of one from a group of items. A table may also be referred to as a grid in which numbers and/or text may be displayed in rows and columns. The foregoing are some examples of UI elements that may be supported in an embodiment in accordance with techniques herein.

Using techniques herein, UI content (e.g., strings), settings of style-based properties and other properties related to UI controls may be dynamically modified such as by code of a target body of code of the application invoked to provide customization and dynamic modification of UI element attributes (e.g., to disable or hide any/all UI elements such as by setting the property of a particular UI element to a value denoting the selected state of enabled, disabled or hidden. The properties may relate, for example, visual aspects of displayed text or content (e.g. font, text size, bolded/not bolded, italicized/not italicized), display state (e.g., enabled/disable/hide) of a UI element, an ordering of displayed elements or text (left to right, right to left, ordering of menu items such as displayed in pull-down menu, size or physical dimensions of a UI element (e.g., width, height), location/position of button on UI display (e.g., may be an absolute or relative location as displayed), sort ordering of buttons or UI element on screen, ordering or position of displayed text in table, listing of UI elements, and the like.)

In one embodiment, the NAV service as described herein may be implemented using an object model including JavaScript objects. In connection with invoking or transferring control to a target body of code of the application (e.g., such as elements 126, 128 of FIG. 3), an object in the model used by the NAV service may be created whereby a method may be specified for the object which is the target body of code. Placement of the object in the object model of the NAV service may result in invoking and transfer of control to the target body of code.

An embodiment may implement the techniques herein using code executed by a processor. For example, an embodiment may implement the techniques herein using code which is executed by a processor. As will be appreciated by those skilled in the art, the code may be stored on a computer-readable storage medium having any one of a variety of different forms including volatile and nonvolatile, removable and non-removable media implemented in any method or technology for storage of information such as computer readable instructions, data structures, program modules or other data. Computer-readable storage media (also referred to as computer readable media or medium) may include, but is not limited to, RAM, ROM, EEPROM, flash memory or other memory technology, CD-ROM, (DVD) or other optical storage, magnetic cassettes, magnetic tape, magnetic disk storage or other magnetic storage devices, or any other medium which can be used to store the desired information and which can accessed by a processor.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for user interface customization for an application comprising:
   receiving, using a processor, a navigational structure file including a description of a hierarchical structure describing a navigational flow of the application, said hierarchical structure including objects corresponding to different navigation points of the application whereby interaction with a user interface element causes transition or navigation from a first navigation point of the application to a second navigation point of the application as described in the hierarchical structure;
   determining, using the processor, whether any one of a defined set of one or more trigger conditions occurs; and responsive to determining an occurrence of a trigger condition in the defined set, performing first processing using the processor and in accordance with the trigger condition that has occurred, wherein said first processing includes:
producing, in accordance with portions of the navigational structure file relevant to the trigger condition that has occurred, a customized navigational flow structure including navigation points of the application relevant to the trigger condition; and
displaying, in accordance with the customized navigational flow structure relevant to the trigger condition, a customized user interface including a plurality of user interface elements denoting an ordered sequence of actions to be performed for the trigger condition that has occurred, wherein the trigger condition that has occurred is any of a defined error state or condition of a system for which the application is used, and wherein each of the plurality of user interface elements of the customized user interface has an ordering or position on a display in accordance with a likelihood that an action associated with said each user interface element is known, based on historical data, to correct the defined error state or condition identified by the trigger condition.

2. The method of claim 1, wherein the trigger conditions include a plurality of trigger conditions and a second trigger condition of the defined set has occurred prior to the trigger condition, wherein the second trigger condition is any of a setting a user-specified mode for a user, and an automatically determined mode in accordance with a role assigned to a user, and wherein the customized navigational flow structure and the customized user interface are further determined in accordance with the second trigger condition.

3. The method of claim 2, wherein the user specified mode is one of a plurality of defined modes each based on a set of one or more tasks performed by a user of a system for which the application is used.

4. The method of claim 3, wherein the system is a data storage system and the application is used to perform data storage system management operations and tasks.

5. The method of claim 4, wherein the plurality of defined modes includes a provisioning mode, a configuration mode and a service mode.

6. The method of claim 5, wherein the plurality of defined modes are specialized modes, a first of the plurality of defined modes is defined as the trigger condition that has occurred whereby the first defined mode is selected or assigned to a user, and responsive to the trigger condition, the user has limited navigation in the navigational structure of the application to one or more portions determined as relevant to the first defined mode.

7. The method of claim 1, wherein the customized user interface displayed to a user is customized to include a simplified user interface with only navigation controls and user interface elements determined as relevant to the trigger condition that has occurred.

8. The method of claim 1, wherein a rules file includes one or more rules, each of said rules identifying at least one of the trigger conditions of the defined set and identifying one or more portions of the navigational structure file relevant for the at least one trigger condition identified by said each rule.

9. The method of claim 8, wherein the first processing includes:
matching the trigger condition that has occurred to a trigger condition included in a first rule of the rules file, said first rule identifying a first portion of the navigation points in the navigational flow of the application described by the navigational structure file as relevant when the trigger condition occurs; and
using the first portion identified by the first rule to determine the customized user interface and the customized navigational flow structure of the application for the trigger condition that has occurred.

10. The method of claim 1, wherein each navigation point of the application is represented by a node in the hierarchical structure, said each navigation point being associated with a content view.

11. The method of claim 10, wherein the hierarchical structure forms a tree structure of a plurality of nodes corresponding to a plurality of navigation points of the application, said tree structure including a plurality of levels, each of said plurality of levels including one or more nodes, said tree structure including a root node at first level and one or more nodes at one or more other levels, and one or more leaf nodes.

12. The method of claim 11, wherein a first content view is associated with a first node that is not a leaf node and represents a first navigation point of the hierarchical structure, said first content view including a first user interface element which, when selected, results in navigation to a second content view associated with a second node representing a second navigation point of the hierarchical structure.

13. The method of claim 12, wherein the first node is a parent node of the second node, and the second node is a child node of the first node.

14. A non-transitory computer readable medium comprising code stored thereon for user interface customization for an application, the non-transitory computer readable medium comprising code that, when executed, performs a method comprising:
receiving a navigational structure file including a description of a hierarchical structure describing a navigational flow of the application, said hierarchical structure including objects corresponding to different navigation points of the application whereby interaction with a user interface element causes transition or navigation from a first navigation point of the application to a second navigation point of the application as described in the hierarchical structure;
determining whether any one of a defined set of one or more trigger conditions occurs; and
responsive to determining an occurrence of a trigger condition in the defined set, performing first processing in accordance with the trigger condition that has occurred, wherein said first processing includes:
producing, in accordance with portions of the navigational structure file relevant to the trigger condition that has occurred, a customized navigational flow structure including navigation points of the application relevant to the trigger condition; and
displaying, in accordance with the customized navigational flow structure relevant to the trigger condition, a customized user interface including a plurality of user interface elements denoting an ordered sequence of actions to be performed for the trigger condition that has occurred, wherein the trigger condition that has occurred is any of a defined error state or condition of a system for which the application is used, and wherein each of the plurality of user interface elements of the customized user interface has an ordering or position on a display in accordance with a likelihood that an action associated with said each user interface element is known, based on historical data, to correct the defined error state or condition identified by the trigger condition.

15. The non-transitory computer readable medium of claim 14, wherein the trigger conditions include a plurality of trigger conditions and a second trigger condition of the defined set has occurred prior to the trigger condition, wherein the second trigger condition is any of a setting a user-specified mode for a user, and an automatically determined mode in accordance with a role assigned to a user, and wherein the customized navigational flow structure and the customized user interface are further determined in accordance with the second trigger condition.

16. The non-transitory computer readable medium of claim 15, wherein the user specified mode is one of a plurality of defined modes each based on a set of one or more tasks performed by a user of a system for which the application is used.

17. A system comprising:
a processor; and
a memory comprising code stored thereon that, when executed by the processor, performs a method for user interface customization for an application comprising:
receiving, using the processor, a navigational structure file including a description of a hierarchical structure describing a navigational flow of the application, said hierarchical structure including objects corresponding to different navigation points of the application whereby interaction with a user interface element causes transition or navigation from a first navigation point of the application to a second navigation point of the application as described in the hierarchical structure;
determining, using the processor, whether any one of a defined set of one or more trigger conditions occurs; and
responsive to determining an occurrence of a trigger condition in the defined set, performing first processing using the processor and in accordance with the trigger condition that has occurred, wherein said first processing includes:
producing, in accordance with portions of the navigational structure file relevant to the trigger condition that has occurred, a customized navigational flow structure including navigation points of the application relevant to the trigger condition; and
displaying, in accordance with the customized navigational flow structure relevant to the trigger condition, a customized user interface including a plurality of user interface elements denoting an ordered sequence of actions to be performed for the trigger condition that has occurred, wherein the trigger condition that has occurred is any of a defined error state or condition of a system for which the application is used, and wherein each of the plurality of user interface elements of the customized user interface has an ordering or position on a display in accordance with a likelihood that an action associated with said each user interface element is known, based on historical data, to correct the defined error state or condition identified by the trigger condition.

* * * * *